United States Patent
Sercel et al.

(10) Patent No.: US 12,297,792 B2
(45) Date of Patent: May 13, 2025

(54) HYBRID SOLAR THERMAL AND CHEMICAL VEHICLE CONFIGURATIONS FOR SPACE MINING APPLICATIONS

(71) Applicant: Trans Astronautica Corporation, Lake View Terrace, CA (US)

(72) Inventors: Joel C. Sercel, Lake View Terrace, CA (US); Philip J. Wahl, Alta Dena, CA (US); James G. Small, Sonoita, AZ (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

(21) Appl. No.: 17/827,429

(22) Filed: May 27, 2022

(65) Prior Publication Data

US 2022/0290635 A1 Sep. 15, 2022

Related U.S. Application Data

(63) Continuation-in-part of application No. 17/382,727, filed on Jul. 22, 2021.
(Continued)

(51) Int. Cl.
*F02K 9/50* (2006.01)
*E21C 51/00* (2006.01)
(Continued)

(52) U.S. Cl.
CPC .............. *F02K 9/50* (2013.01); *E21C 51/00* (2013.01); *F02K 9/64* (2013.01); *F02K 9/68* (2013.01)

(58) Field of Classification Search
None
See application file for complete search history.

(56) References Cited

U.S. PATENT DOCUMENTS

| 1,964,189 A | 6/1934 | Koomans |
| 2,930,187 A | 3/1960 | Chillson |

(Continued)

FOREIGN PATENT DOCUMENTS

| AU | 2007200666 A1 | 8/2007 |
| CN | 103075816 | 5/2013 |

(Continued)

OTHER PUBLICATIONS

Alternative Scenarios Utilizing Nonterrestrial Resources Charles H. Eldred and Barney B. Roberts, Space Resources Scenarios NASA 1992.
(Continued)

*Primary Examiner* — Jason Lau
(74) *Attorney, Agent, or Firm* — Knobbe, Martens, Olson & Bear, LLP

(57) ABSTRACT

Solar thermal and chemical hybrid rocket configurations for mining and other space applications are disclosed. One aspect is a rocket propulsion system configured to provide rocket thrust, including a solar absorber, a rocket nozzle, and a solar power collection system configured to collect solar energy from the sun, generate an energy beam from the collected sunlight, heat the solar absorber to transfer heat to one or more pressurized propulsive gases, and expel the heated pressurized propulsive gases through a rocket nozzle. A solar absorber can be formed from a granular collection or agglomeration of solids (e.g., of beads), which can be layered with more transparent layer(s) above and more absorbing layer(s) below to create a temperature profile in propellant(s) flowing through the absorber. A hybrid motor can provide an energy (e.g., solar) absorber for absorbing and transferring radiative energy as well as a combustion area. Multiple propellants can be present in a single chamber and be forced from a nozzle to produce thrust. Pressure in a
(Continued)

rocket can be achieved from heating inert gasses, and alternatively or simultaneously, from mixing and igniting non-inert gasses.

31 Claims, 16 Drawing Sheets

Related U.S. Application Data

(60) Provisional application No. 63/055,231, filed on Jul. 22, 2020.

(51) Int. Cl.
    *F02K 9/64*            (2006.01)
    *F02K 9/68*            (2006.01)

(56) References Cited

U.S. PATENT DOCUMENTS

| | | | |
|---|---|---|---|
| 2,945,234 A | | 7/1960 | Driscoll |
| 2,975,592 A | | 3/1961 | Fox |
| 2,990,836 A | | 7/1961 | Bird |
| 2,991,617 A | | 7/1961 | Nerad |
| 3,063,521 A | | 11/1962 | Fuller |
| 3,064,418 A | * | 11/1962 | Sanders ........... F24S 10/80 376/318 |
| 3,202,998 A | | 8/1965 | Hoffman |
| 3,564,253 A | | 2/1971 | Buckingham |
| 3,597,923 A | | 8/1971 | Simon |
| 3,606,211 A | | 9/1971 | Roersch et al. |
| 4,013,885 A | | 3/1977 | Blitz |
| 4,073,138 A | | 2/1978 | Beichel |
| 4,122,239 A | * | 10/1978 | Riboulet ........... F24S 70/25 359/359 |
| 4,135,489 A | | 1/1979 | Jarvinen |
| 4,286,581 A | | 1/1981 | Atkinson, Jr. |
| 4,263,895 A | * | 4/1981 | Colao ........... F24S 20/20 126/714 |
| 4,449,514 A | | 5/1984 | Selcuk |
| 4,459,972 A | | 7/1984 | Moore |
| 4,480,677 A | | 11/1984 | Henson et al. |
| 4,528,978 A | | 7/1985 | Robinson |
| 4,564,275 A | | 1/1986 | Stone |
| 4,771,599 A | | 9/1988 | Brown |
| 4,771,600 A | | 9/1988 | Limerick |
| 4,781,018 A | | 11/1988 | Shoji |
| 4,815,443 A | | 3/1989 | Vrolyk |
| 4,932,910 A | | 6/1990 | Hayday |
| 5,014,131 A | | 5/1991 | Reed et al. |
| 5,047,654 A | | 9/1991 | Newman |
| 5,104,211 A | | 5/1992 | Schumacher et al. |
| 5,114,101 A | | 5/1992 | Stern et al. |
| 5,138,832 A | | 8/1992 | Pande |
| 5,202,541 A | | 4/1993 | Patterson |
| 5,266,762 A | | 11/1993 | Hoffman |
| 5,305,970 A | | 4/1994 | Porter et al. |
| 5,459,996 A | | 10/1995 | Malloy, III |
| 5,511,748 A | | 4/1996 | Scott |
| 5,578,140 A | | 11/1996 | Yogev |
| 5,593,549 A | | 1/1997 | Stirbl et al. |
| 5,674,794 A | | 10/1997 | Chatterjee |
| 5,751,895 A | | 5/1998 | Bridges |
| 5,861,947 A | | 1/1999 | Neumann |
| 5,979,438 A | | 11/1999 | Nakamura |
| 5,982,481 A | | 11/1999 | Stone |
| 6,052,987 A | | 4/2000 | Dressler |
| 6,057,505 A | | 5/2000 | Ortabasi |
| 6,193,193 B1 | | 2/2001 | Sorrano |
| 6,290,185 B1 | * | 9/2001 | DeMars ........... F02C 1/05 244/171.1 |
| 6,343,464 B1 | * | 2/2002 | Westerman ........... F24S 20/20 60/641.15 |
| 6,350,973 B2 | | 2/2002 | Wroe |
| 6,532,953 B1 | | 3/2003 | Blackmon |
| 6,669,148 B2 | | 12/2003 | Anderman et al. |
| 6,742,325 B2 | | 6/2004 | Kudija, Jr. |
| 7,207,327 B2 | | 4/2007 | Litwin |
| 7,387,279 B2 | | 6/2008 | Anderman et al. |
| 7,575,200 B2 | | 8/2009 | Behrens et al. |
| 7,594,530 B1 | | 9/2009 | Tucker |
| 7,823,837 B2 | | 11/2010 | Behrens et al. |
| 7,997,510 B2 | | 6/2011 | Pavia et al. |
| 8,033,110 B2 | | 10/2011 | Gilon et al. |
| 8,147,076 B2 | | 4/2012 | Ezawa |
| 8,357,884 B1 | | 1/2013 | Ethridge |
| 8,379,310 B2 | | 2/2013 | Mori et al. |
| 9,010,317 B1 | | 4/2015 | Gross |
| 9,187,191 B1 | | 11/2015 | Jensen et al. |
| 9,222,702 B2 | | 12/2015 | Goldberg |
| 9,266,627 B1 | | 2/2016 | Anderson |
| 9,409,658 B1 | | 8/2016 | Diamandis et al. |
| 9,581,021 B2 | | 2/2017 | Ethridge |
| 9,676,499 B2 | | 6/2017 | Myers et al. |
| 9,709,771 B2 | | 7/2017 | Corrigan |
| 9,771,897 B2 | | 9/2017 | Soulier |
| 10,032,285 B1 | | 7/2018 | Ma |
| 10,445,862 B1 | | 10/2019 | Merry et al. |
| 10,654,596 B1 | | 5/2020 | Eller |
| 10,919,227 B2 | | 2/2021 | Cook |
| 10,989,443 B1 | | 4/2021 | Sercel et al. |
| 11,085,669 B2 | | 8/2021 | Sercel |
| 11,143,026 B2 | | 10/2021 | Sercel et al. |
| 11,188,750 B1 | | 11/2021 | Ma et al. |
| 11,280,194 B2 | | 3/2022 | Sercel |
| 11,391,246 B2 | | 7/2022 | Sercel et al. |
| 11,643,930 B2 | | 5/2023 | Sercel |
| 12,025,006 B2 | | 7/2024 | Sercel |
| 2002/0075579 A1 | | 6/2002 | Vasylyev et al. |
| 2002/0184873 A1 | | 12/2002 | Dujarric |
| 2003/0029969 A1 | | 2/2003 | Turner |
| 2003/0173469 A1 | | 9/2003 | Kudija et al. |
| 2003/0224082 A1 | | 12/2003 | Akopyan |
| 2004/0004184 A1 | | 1/2004 | Schubert |
| 2004/0231716 A1 | | 11/2004 | Litwin |
| 2006/0191916 A1 | | 8/2006 | Stephan et al. |
| 2006/0233421 A1 | | 10/2006 | Portigal et al. |
| 2007/0128582 A1 | | 6/2007 | Anderson et al. |
| 2008/0000232 A1 | | 1/2008 | Rogers et al. |
| 2008/0023060 A1 | | 1/2008 | Grumazescu |
| 2008/0134667 A1 | | 6/2008 | Pavia et al. |
| 2008/0156315 A1 | | 7/2008 | Yangpichit |
| 2009/0293448 A1 | | 12/2009 | Grote et al. |
| 2010/0038491 A1 | | 2/2010 | Cepollina et al. |
| 2010/0163683 A1 | | 7/2010 | Quine |
| 2010/0252024 A1 | | 10/2010 | Convery |
| 2010/0269817 A1 | | 10/2010 | Kelly |
| 2010/0294261 A1 | | 11/2010 | Deforge |
| 2010/0319678 A1 | | 12/2010 | Maemura et al. |
| 2011/0031238 A1 | | 2/2011 | Segawa |
| 2011/0041894 A1 | | 2/2011 | Liao |
| 2011/0127382 A1 | | 6/2011 | Im |
| 2011/0185728 A1 | | 8/2011 | Meyers et al. |
| 2011/0220091 A1 | | 9/2011 | Kroyzer |
| 2011/0315678 A1 | | 12/2011 | Furuya |
| 2012/0155966 A1 | | 6/2012 | Zillmer |
| 2013/0021471 A1 | | 1/2013 | Waterhouse |
| 2013/0206209 A1 | | 8/2013 | Lasich |
| 2013/0239952 A1 | | 9/2013 | Kroyzer |
| 2014/0138952 A1 | | 5/2014 | Marumoto |
| 2014/0150651 A1 | | 6/2014 | Velasco Valcke |
| 2014/0174430 A1 | | 6/2014 | Fitzgerald et al. |
| 2014/0262278 A1 | | 9/2014 | Walton |
| 2014/0318127 A1 | | 10/2014 | Kerns |
| 2015/0027102 A1 | | 1/2015 | Bahn et al. |
| 2015/0180114 A1 | | 6/2015 | Achour |
| 2016/0010442 A1 | | 1/2016 | Kearl |
| 2016/0024921 A1 | | 1/2016 | Ethridge |
| 2016/0075453 A1 | | 3/2016 | Sauzay et al. |
| 2016/0076792 A1 | | 3/2016 | Magaldi |
| 2016/0121395 A1 | | 5/2016 | Kawanaka |
| 2016/0300341 A1 | | 10/2016 | Hay et al. |
| 2017/0039446 A1 | | 2/2017 | Silny et al. |
| 2017/0129579 A1 | | 5/2017 | De Jong |

(56) References Cited

U.S. PATENT DOCUMENTS

| | | |
|---|---|---|
| 2017/0358103 A1 | 12/2017 | Shao et al. |
| 2018/0194626 A1 | 7/2018 | Berggren et al. |
| 2018/0238272 A1 | 8/2018 | Renaud |
| 2018/0265224 A1 | 9/2018 | Foulds et al. |
| 2019/0271228 A1 | 9/2019 | Sowers, Jr. et al. |
| 2021/0061494 A1 | 3/2021 | Belieres Montero |
| 2021/0150253 A1 | 5/2021 | Akagunduz et al. |
| 2021/0197987 A1 | 7/2021 | Kokorich et al. |
| 2021/0333019 A1 | 10/2021 | Sercel et al. |
| 2022/0024612 A1 | 1/2022 | Sercel et al. |
| 2022/0046612 A1 | 1/2022 | Sercel et al. |
| 2022/0082019 A1 | 3/2022 | Sercel et al. |
| 2022/0089302 A1 | 3/2022 | Sercel et al. |
| 2022/0090500 A1 | 3/2022 | Sercel |
| 2022/0268524 A1 | 8/2022 | Small |
| 2022/0275721 A1 | 9/2022 | Sercel |
| 2023/0130545 A1 | 4/2023 | Sercel |
| 2023/0249848 A1 | 8/2023 | Sercel |
| 2023/0280098 A1 | 9/2023 | Small |
| 2023/0383650 A1 | 11/2023 | Sercel |
| 2023/0399946 A1 | 12/2023 | Sercel |
| 2024/0159076 A1 | 5/2024 | Sercel |

FOREIGN PATENT DOCUMENTS

| | | |
|---|---|---|
| CN | 109102522 | 12/2018 |
| DE | 10350734 | 3/2005 |
| DE | 102004026517 B3 | 10/2005 |
| EP | 2 177 846 | 4/2010 |
| EP | 2 195 583 | 3/2013 |
| ES | 2639583 | 10/2017 |
| GB | 1481234 | 7/1977 |
| JP | 2012-038954 | 2/2012 |
| JP | 2019-148155 | 9/2019 |
| RU | 2344973 | 1/2009 |
| RU | 02353775 | 4/2009 |
| WO | WO 16/172647 | 10/2016 |
| WO | WO 20/033561 | 2/2020 |

OTHER PUBLICATIONS

Antarctic Meteorite Sample, Investigator's Guidebook, Astromaterials Research and Exploration Science Directorate KA, Astromaterials Acquisition and Curation Office/KT, JSC-66468, Lyndon B. Johnson Space Center, Houston TX.

Arnold, J.R., "Ice in the lunar polar regions", J. Geophys. Res 84., 1979, pp. 5659-5668.

Badescu, V., "Asteroids: Prospective Energy and Material Resources," Jul. 14, 2013, ISBN-13:978-3642392438.

Binzel, R., "Human Spaceflight: Find Asteroids to get to Mars." Nature 514, 559-561, Oct. 29, 2014.

Bliss, T., et al. "Experimental validation of robust resonance entrainment for cpg-controlled tensegrity structures." IEEE Transactions on Control Systems Technology, 2012, vol. 21(3), pp. 666-678.

Bottke, W.F., et al., Debiased orbital and Absolute Magnitude Distribution of the near-Earth objects, Icarus 156, 399-433, 2002.

Bowersox, Kenneth and NASA Advisory Council Committee on Human Exploration and Operations, "NASA Advisory Council Finding on NASA Human Exploration Strategy," from the Council Public Deliberation, Jul. 31, 2014.

Boyle, A., "Blue Origin Space venture slips in a sneak peek at design of Blue Moon lunar lander", Apr. 5, 2017, https://www.geekwire.com/2017/blue-origin-sneak-peek-blue- moon-lunar-lander/.

Boyle, A., "Jeff Bezos lays out his vision for city on the moon, complete with robots", May 20, 2017,https://www.geekwire.com/2017/jeff-bezos-blue-origin-moon/.

Brophy, J., et al., "Spacecraft Conceptual Design for Returning Entire Near-Earth Asteroids," 48th AIAA/ASME/SAE/ASEE Joint Propulsion Conference & Exhibit and 10th International Energy Conversion Engineering Conference, Atlanta, George Jul. 29-Aug. 1, 2012.

Brown, P., et al., The Flux of small near-Earth objects colliding with the Earth, Nature 420, 294-296, 2002.

Bussey, D. B. J., et al., "Permanent shadow in simple craters near the lunar poles," Geophysical Research Letters, 2003, vol. 30, No. 6, 1278, pp. 11-1-11-4.

Cassapakis, C.G., et al., "A Power Antenna for Deep Space Missions," Solar Engineering Editors: J.H. Davidson and J. Chavez. Book No. HO1046, 1996.

Ceruti, Conceptual Design and Preliminary Structural Analysis of Inflatable Basket for an Asteroid Capturing Satellite; Strojniški vestnik—Journal of Mechanical Engineering 61(2015)5, 341-351 Received for review: Jul. 17, 2014; © 2015 Journal of Mechanical Engineering; DOI:10.5545/sv-jme.2014.2063; in 11 pages.

Chen, L.H., et al., Soft spherical tensegrity robot design using rod-centered actuation and control, Journal of Mechanisms and Robotics, 2017, vol. 9(2) pp. 025001.

Chen, M., et al., "Energy analysis of growth adaptable artificial gravity space habitat," AIAA Space and Astronautics Forum and Exposition, 2018, in 13 pages.

Cohen, Marc M., et al., "Asteroid Mining," AIAA 2013-5304, presented at AIAA Space 2013 Conference and Exposition, Sep. 10-12, 2013, San Diego, CA.

Colaprete, A., et al., "Detection of water in the Icross ejecta plume," Science, vol. 330, pp. 463-468, Oct. 22, 2010.

Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.

Craft, J., et al. "Percussive digging systems for planetary research" IEEE Aerospace and Electronic Systems Magazine, 2010, vol. 25 pp. 21-26.

Crawford, I.A., Lunar resources: A review. Progress in Physical Geography, 39(2):137-167, 2015.

Crusan, J., "an Evolvable Mars Campaign" NASA Presentation, Jul. 2014, available at https://www.nasa.gov/sites/default/files/files/20140429-Crusan-Evolvable-Mars-Campaign.pdf.

David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/30582-asteroid-mining-water-propulsion.html>.

Duke, M., et al., "Mining of lunar polar ice", 36th AIAA Aerospace Sciences Meeting and Exhibit, 1998, pp. 1069.

Ehricke, K.A., "The Solar-Powered Space Ship," ARS Paper 310-56, Jun. 1956.

Eldred, et al., "Alternative Scenarios Utilizing Nonterrestrial Resources", Space Resources Scenarios NASA, 1992.

Erickson, K., "Optimal Architecture for an Asteroid Mining Mission: Equipment Details and Integration" Collection of Technical Papers—Space Conference 2006, Sep. 19-21, 2006, San Jose, California; AIAA 2006-7504; in 17 pages.

Etheridge, F.G., "Solar-Rocket System Concept Analysis", Final Report on AFRPL Contract F04611-79-C-0007, AFRPL-TR-79-79, Rockwell International, Space Systems Group, Downey CA 90241, Nov. 1979.

Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.

FAA 2012 Commercial Space Transportation Forecasts. Available at http://www.faa.gov/about/office_org/headquarters_offices/ast/media/The_Annual_Compendium_of_Commercial_Space_Transporation_2012.pdf.

Fabbrocino, F., et al., "Optimal prestress design of composite cable-stayed bridges". Composite Structures, 2017, vol. 169, pp. 167-172.

Feldman, W. C., et al., (1998). "Fluxes of fast and epithermal neutrons from Lunar Prospector", Evidence for water ice at the lunar poles, science 281, 1998, pp. 1496-1500.

Fincannon, J., "Lunar Polar Illumination for Power Analysis", NASA/TM, 2008-215446, https://ntrs.nasa.gov/archive/nasa/casi.ntrs.nasa.gov/20080045536.pdf.

Fisher, E.A., et al., "Evidence for surface water ice in the lunar polar regions using reflectance measurements from the Lunar Orbiter

(56) References Cited

OTHER PUBLICATIONS

Laser Altimeter and temperature measurements from the Diviner Lunar Radiometer Experiment", Lunar Polar Volaties, 2018, LBI Contrib. No. 2087.

Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, pp. 74.

Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.

Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.

Garenne, A.B., et al., "The Abundance and Stability of Water in Type 1 and 2 Carbonaceous Chondrites," CI, CM, and CRI Geochimica et Cosmochimica Acta 137, 93-112, 2014.

Gertsch, L.S., et al., Laboratory Demonstration and Test of Solar Thermal Asteroid ISRU, funded NASA Early Stage Innovations Space Tech Research Grants, Proposed 2014, funded Jan. 2015.

Gertsch, R.E., et al., "Near Earth Resources," In Near Earth Objects, Annals of the New York Academy of Science, vol. 822, p. 468-510, 1997.

Gertsch, R.E., et al., "Mining near Earth resources," In Near Earth Objects, Annals of the New York Academy of Sciences, vol. 822, p. 511-537, 1997.

Gläser, P., et al., "Illumination conditions at the lunar poles: Implications for future exploration". Planetary and Space Science, in press, 2017, https://doi.org/10.1016/j.pss. 2017.07.006.

Goyal, R., et al., "Analytical study of tensegrity lattices for mass-efficient mechanical energy absorption", International Journal of Space Structures, 2018.

Goyal, R., et al., "Modeling of tensegrity structures", Journal of Open Source Software, 2019, vol. 4(42), pp. 1613.

Goyal, R., et al., "Tensegrity system dynamics with rigid bars and massive strings", Multibody System Dynamics, 2019, vol. 46(3) pp. 203-228.

Granvik et al., Abstract, IAU-Symposium: Complex Planetary Systems, Jul. 7-11, 2014, Namur, Belgium.

Granvik, M., et al., "The population of natural Earth satellites," Icarus, 2012.

Griffin, M.D., et al., "Space Vehicle Design, Second Edition (AIAA Education)", pp. 29-37, Feb. 23, 2004.

Grip; Modeling and Simulation of Asteroid Capture Using a Deformable Membrane Capture Device; Proceedings of the ASME 2015 International Design Engineering Technical Conferences & Computers and Information in Engineering Conference; IDETC/CIE 2015; Aug. 2-5, 2015; Boston, USA; In 10 pages.

Grossman, G., et al, "Inflatable Concentrators for Solar Propulsion and Dynamic Space Power." Journal of Solar Energy Engineering, Nov. 1990, vol. 112/229.

Harwood, William, "NASA's proposed asteroid retrieval mission outlined." Posted in Space Flight Now: Apr. 6, 2013. Available at https://spaceflightnow.com/news/n1304/06asteroid/.

Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.

Hayne, P.O., et al., "Diviner Lunar Radiometer Observations of the LCROSS Impact", Science 330, 2010, pp. 477.

Heiken, G.H., et al., "Lunar sourcebook-a user's guide to the moon". NASA,. Cambridge, England, Cambridge University Press, 1991, vol. 753, pp. No individual items are abstracted in this volume.

Interbartolo III. Michael A, et al, "Prototype Development of an Integrated Mars Atmosphere and Soil-Processing System", Journal of Aerospace Engineering, Jan. 2013, vol. 26(1), pp. 57-66.

Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.

Lawrence, D. J., et al., "Evidence for water ice near Mercury's north pole from messenger Neutron Spectrometer measurements". Science 339, 2013, pp. 292-296.

Lewis, J.A., "Logistical Implications of Water Extraction from Near-Earth Asteroids," Proceedings of the Eleventh SSI-Princeton Conference, May 12-15, 1993.

Lewis, J.A., "Hard Choices for Manned Spaceflight: America as Icarus", http://csis.org/files/publication/140508_Lewis_HardChoicesMannedSpaceflight_Web.pdf, 2014.

Lewis; Mining the Sky; Untold Riches from the Asteroids, Comets, and Planets; Library of Congress Cataloging-in-Publication Data; ISBN 0-201-47959-1; 1996; 66 pages (pp. 7-11, 32, 49-74, 108-127, 134-141, 198-200).

Li, S. et al., "Possible detection of surface water ice in the lunar polar regions using data from the Moon Mineralogy Mapper (M3)," presented at LPSC XLVIII, Mar. 2017, Houston, TX.

Lunar Exploration Advisory Group "Commercial Lunar Propellant Architecture A Collaborative Study of Lunar Propellant Production", Final Report. Aug. 2018.

Masten, Jun. 17, 2021, Break the ice: Masten designs rocket mining system to extract lunar water, blog, 8 pp.

Mazanek et al., "Asteroid Retrieval Mission Concept—Trailblazing Our Future in Space and Helping to Protect Us from Earth Impactors." Planetary Defense Conference 2013, pp. 3, 5 [online] <URL: http://ntrs.nasa.gov/archive/nasa/casi.ntrs.nasa.gov/20130013170.pdf>.

Mazarico, E., et al., "Illumination Conditions of the Lunar Polar Regions Using LOLA Topography." Icarus, vol. 211, No. 2, 2011, pp. 1066-1081., doi: 10.1016/j.icarus. 2010.10.030.

Mommert, M., et al, "Constraining the Physical Properties of Near-Earth Object 2009 BD," The Astrophysical Journal, vol. 786, No. 2.

Nagase, K., et al., "Minimal mass tensegrity structures", The International Association for Shell and Spatial Structures, 2014, vol. 55(1), pp. 37-48.

NASA Report from Office of the Chief Technologist, Emerging Space: The Evolving Landscape of 21st Century American Spaceflight, http://images.spaceref.com/docs/ 2014/Emerging_Space_Report.pdf.

NASA, "Asteroid Redirect Mission Reference Concept," 2013.

Norton, B., "Harnessing Solar Heat," Springer, pages C1-xiii, 39 and 48-73, ISBN 978-007-7275-5, 2013.

Pike R.J., "Crater dimensions from Apollo data and supplemental sources". The Moon, 1976, vol. 15, pp. 463-477.

Pike, R.J., "Depth/diameter relations of fresh lunar craters: Revision from spacecraft data", Geophysical Research Letters, 1974, vol. 1(7), pp. 291-294.

Rapp, D., "Use of Extraterrestrial Resources for Human Space Missions to Moon or Mars (Springer Praxis Books / Astronautical Engineering)" published Nov. 20, 2012.

Reinhold; A Solar Powered Station at a Lunar Pole; Feb. 18, 2021; https://theworld.com/~reinhold/lunarpolar.html; 7 pages.

Rimoli, J.J., et al., "Mechanical response of 3-dimensional tensegrity lattices", Composites Part B: Engineering, 2017, vol. 115, pp. 30-42.

Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.

Rostami, J., et al., "Lunar tunnel boring machines", In Earth and Space 2018: Engineering for Extreme Environments, American Society of Civil Engineers, pp. 240-252, 2018, Reston, VA.

Sabelhaus, A.P., et al. "Model-predictive control of a flexible spine robot", American Control Conference, 2017, IEEE, pp. 5051-5057.

Sanders, Oct. 10, 2019, NASA Lunar ISRU Strategy, presented at the What Next for Space Resource Utilization? Workshop, Luxembourg, 20 pp.

(56) References Cited

OTHER PUBLICATIONS

Schlaich, M., "The messeturm in Rostock—A tensegrity tower", Journal of the International Association for Shell and Spatial Structures, 2004, vol. 45(2), pp. 93-98.
Sercel, "Demonstration of "Optical Mining" for Excavation of Asteroids and Production of Mission Consumables." NASA SBIR. Apr. 23, 7015 (Apr. 23, 2015), pp. 1-2, [online] <URL: http://sbir.nasa.gov/SBIR/abstracts/15/sbir/phase1/SBIR-15-1-H1 .01-9278.html>.
Sercel, J.C., "Solar Thermal Propulsion for Planetary Spacecraft", presented at the JANNAF Propulsion Conference, San Diego, CA, Apr. 9-12, 1985.
Sercel, J.C., et al., "APIS(Asteroid Provided in-Situ Supplies): 100MT of Water, One Falcon 9 Launch" NIAC Phase 1a proposal submitted Nov. 2014.
Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.
Sercel, Apr. 22, 2015, Worker Bees: thin-film solar thermal technology enables water-based cis-lunar transportation architecture, ICS Associates Inc., 109 pp.
Sercel; Time Dependent Finite Difference Modeling of Outgassing of Asteroids via Bulk Heating; 978-1-5386-2014-4/18/$31.00 © 2018 IEEE; I 14 pages.
Shao, M.B., et al., "Finding very Small Near-Earth Asteroids using Synthetic Tracking," Astrophysics .J 782:1, 2014, arXiv, 1309.3248.
Shapiro, I and the Committee to Review Near-Earth Object Surveys and Hazard Mitigation Strategies. Final Report, National Research Council, National Academies Press, 2010.
Shoji, J. M., et al., "Solar Thermal Propulsion Status and Future", AIAA-92-1719, AIAA Space Programs and Technologies Conference, Mar. 1992.
Skelton, R.E., Tensegrity Systems, 2009, Springer US.
Sowers et al., 2019, Ice mining in lunar permanently shadowed regions, New Space, 7(4):235-244.
Sowers, Jun. 12, 2018, Closing the Business Case for Lunar Propellant, PowerPoint presentation, 13 pp.
Spudis, P., et al., "Evidence for water ice on the moon: Results for anomalous polar craters from the lro mini-rf imaging radar", Journal of Geophysical Research: Planets, 2013, vol. 118(10), pp. 2016-2029.
Squyres, S. and the NASA Advisory Council, Recommendation Regarding Mismatch Between NASA's Aspirations for Human Space Flight and Its Budget, from the Council Public Deliberation, Jul. 31, 2014.
Staugaitis, C., et al., "Mechanical and Physical Properties of the Echo II Metal-Polymer Laminate (NASA TND-3409)," NASA Goddard Space Flight Center, 1966.
Stoica, A. et al., "TransFormers of Extreme Environments and Their Integration in a Solar Power Infrastructure". AIAA Space 2016, AIAA Space Forum, 2016.
Stoica, A. et al., NIAC Phase II Final Report, Early Stage Innovation, NASA Innovative Advanced Concepts (NIAC), "TransFormers for Lunar Extreme Environments: Ensuring Long-Term Operations in Regions of Darkness and Low Temperatures", Nov. 2017.
Sultan, C., et al, "Deployment of tensegrity structures", International Journal of Solids and Structures, 2003, vol. 40(18), pp. 4637-4657.
Sunspiral, V., et al, "Tensegrity based probes for planetary exploration: Entry, descent and landing (edl) and surface mobility analysis", International Journal of Planetary Probes, 2013, vol. 7, pp. 13.
Taylor, G.J., "Using the Resources of the Moon to Expand Earth's Economic Sphere." Planetary Science Research Discoveries Report (2019): E205. Nov. 14, 2019 http://www.psrd.hawaii.edu/Nov19/PSRD-lunar-isru.pdf.

Thomas, M. et al., "Scaling Characteristics of Inflatable Paraboloid Concentrators", Presented at the Second ASME-JSES-JSME International Solar Energy Conference, Reno, Nevada, Mar. 17-22, 1991.
Tukkaraja, P., et al. Lunar mining and processing for in situ resource utilization, Earth and Space 2018: Engineering for Extreme Environments, American Society of Civil Engineers, 2018, pp. 401-413, Reston, VA.
Vasavada, A. R., et al., "Near-Surface Temperatures on Mercury and the Moon and the Stability of Polar Ice Deposits". Icarus, 1999, vol. 141, pp. 179-193.
Wihite, Alan, et al., Evolved Human Space Exploration Architecture Using Commercial Launch/Propellant Depots, 63rd International Astronautical Congress, Naples, Italy, 2012.
Yildiz, K., et al, "Effective beam stiffness properties of n-strut cylindrical tensegrity towers", AIAA Journal,2019, vol. 57(5), pp. 2185-2194.
Yildiz, K., et al., "A novel deployment strategy for tensegrity towers", AIAA Spacecraft Structures Conference, 2018, pp. 0693.
Zacny; Asteroid Mining; AIAA Space 2013 Conference and Exposition Sep. 10-12, 2013, San Diego, CA; AIAA 2013-5304; in 16 pages.
Zegler, Frank, et al., "Evolving to a Depot-Based Space Transportation Architecture" AIAA Space 2010 Conference and Exposition. Aug. 30-Sep. 2, 2010, Anaheim, CA, AIAA 2010-8638.
Gural et al., 2022, Development of a very faint meteor detection system based on an EMCCD sensor and matched filter processing, Experimental Astronomy, 53:1085-1126.
Gural et al., Jul. 2018, Moving Object Detection using a Parallax Shift Vector Algorithm, Publ Astron Soc Pac, 130(989):074504, 30 pp.
Gural et al., Nov. 2003, Matched Filter Processing for Asteroid Detection in Cluttered Star Fields, Proceedings of the Core Technologies for Space Systems Conf., 17 pp.
Gural et al., Oct. 2003, Asteroid Search with Advanced Detection Algorithmsto Existing Asteroid Search Programs, NASA Center for AeroSpace Information (CASI) report ID# 20040021361, 18 pp.
Gural et al., Oct. 2005, Matched Filter Processing for Asteroid Detection, Astronomical Journal, 130:1951-1960.
Gural, 2016, Final Report and Recommendations for Asteroid Search Algorithms when Applied to the Low Earth Orbiting Asteroid Surveillance Satellite NEOSSat, Leidos contractual final report submitted to NASA HQ via Planetary Sciences Institute, 51 pp.
Mohanty, Sep. 1981, Computer Tracking of Moving Point Targets in Space, IEEE Trans. Pattern Anal. Machine Intell., 3(5):606-611.
Pohlig, Jan. 16, 1992, Maximum Likelihood Detection of Electrooptic Moving Targets, MIT Technical Report 940, Lexington, MA, 58 pp.
Reed et al., Jul. 1988, Optical moving target detection with 3-D matched filtering, IEEE Trans. Aerosp. Electron. Syst., 24(4):327-336.
Sanders-Reed, 1998, Maximum likelihood detection of unresolved moving targets, IEEE Trans. Aerosp. Electron. Syst., 34(3):844-859.
Ulas et al., 2013, Numerical analysis of regenerative cooling in liquid propellant rocket engines, Aerospace Science and Technology 24(1):187-197.
Antenna-theory.com, 2015, https://antenna-theory.com/antennas/dipole.php 7/7, The dipole antenna, accessed Aug. 10, 2023.
Antenna-theory.com, 2015, https://www.antenna-theory.com/tutorial/txline/transmissionline.php, Introduction to transmission lines, accessed Aug. 10, 2023.
Bradford et al., Jul. 9, 2001, Fresnel concentrators for space solar power and solar thermal propulsion: final report, United Applied Technologies, Inc., 22 pp.
Stewart et al., Sep. 1996, Dual fuel solar thermal stage—ideal analysis, Journal of Spacecraft and Rockets, 33(5):752-754.

\* cited by examiner

HYBRID SOLAR THERMAL AND CHEMICAL VEHICLE CONFIGURATIONS FOR SPACE MINING APPLICATIONS

INCORPORATION BY REFERENCE TO ANY PRIORITY APPLICATIONS

This application is a continuation-in-part of U.S. Non-Provisional patent application Ser. No. 17/382,727, filed on Jul. 22, 2021, which is based upon and claims the benefit of priority from U.S. Provisional Patent Application No. 63/055,231 filed on Jul. 22, 2020. Moreover, any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

Field

Aspects of this disclosure relate to systems and methods for using solar energy from the sun and/or chemical energy to provide thrust for a spacecraft. The disclosed structures and configurations can be especially useful for obtaining and using propellants from space mining, for example.

SUMMARY OF CERTAIN INVENTIVE ASPECTS

Commercial economic activity in near-earth space and in regions beyond is growing rapidly. In the inner solar system, industrial levels of continuous solar power may be collected by using light-weight concentrating mirrors. The mirrors may be deployed from orbiting spacecraft or may be installed upon relatively fixed installations such as asteroids or low gravity moons. Light-weight mirror structures can collect powerful energy beams, but their reduced dimensional stability (compared to heavier terrestrial designs) may allow the energy beams to wander off target causing damage to supporting structures. It is desirable to have an active control system that can compensate for dimensional changes.

Aspects of this disclosure provide at least two types of robust sensors for use in feedback control systems. The sensors directly sample the full diameter of the energy beams during high power operation. The first method employs imaging cameras that view small amounts of visible energy which is inadvertently scattered from nominally well-polished optical surfaces. The second method places a fine wire grid across the path of an energy beam and measures resistance changes in the wires due to thermal heating. Both methods may involve determining the energy centroid of an energy beam. In the event of beam wander, both methods can provide electrical error signals which can be used to adjust various optical elements to correct for dimensional drift in light-weight structures. Depending on the particular embodiment, one or both of the methods can be applied to generate the electrical error signals used to adjust the optical elements.

Further aspects of this disclosure provide protective shutters which can be closed to permit progressive alignment of high energy beams throughout a spacecraft beam transport system while protecting the spacecraft structure from unintended damage due to misaligned high energy beams.

Still further aspects of this disclosure provide shutters which can be used to interrupt an energy beam for the purpose of selectively heating nearby light-weight surfaces to eliminate moisture and frost buildup.

In one aspect, there is provided a method for protecting spacecraft against unintentional damage from concentrated solar energy-beams by blocking the beams or preventing the concentration of damaging levels of solar energy whenever the beams could potentially damage spacecraft structures.

In another aspect, there is provided a method for protecting spacecraft against unintentional damage from concentrated solar energy beams.

In some embodiments, a plurality of energy-beam sensors monitor continually the directions of solar energy beams with respect to a spacecraft structure without disrupting the said energy beams during normal spacecraft operations. Data from the sensors may be used to provide pointing and tracking information for solar power collection and may also be used to provide warning alerts and shutdown commands whenever energy beams point in potentially damaging directions.

In some embodiments, physical elements may be rapidly interposed into the beam path of a solar energy collection system in order to prevent the formation of a concentrated beam or to absorb or to harmlessly scatter the concentrated energy. The physical elements may include optical shutters, blocking plates, absorbers, diffusers, or optical elements which deflect or defocus solar energy-beams.

In some embodiments, concentrated solar-energy beams may be blocked with a response time that is shorter than the time for thermal damage to occur in spacecraft structures.

In yet another aspect, a method involves using an imaging camera to continually monitor diffusely scattered light from a nominally specular optical reflecting surface in order to derive adjustment signals for the alignment of optical elements in a solar energy collection system.

In some embodiments, an imaging camera on a spacecraft is used to align a large solar collecting mirror directly at the sun without reference to an additional highly accurate sun tracking device.

In some embodiments, an imaging camera on a spacecraft is used to detect misalignment of a concentrated beam of light on an optically reflecting surface in order to prevent a misdirected solar energy beam that could cause unintended damage to parts of the spacecraft structure.

In some embodiments, an imaging camera on a spacecraft is used to detect and measure misalignment of a concentrated beam of light incident upon a closed protective shutter for the purpose of aligning the beam of light before it can be directed to additional optical elements and thereby reducing the risk of unintended damage to the spacecraft structure.

In some embodiments, an opaque cover plate is placed to temporarily intercept and block a beam of concentrated solar energy, wherein heating of the cover plate and re-radiation of thermal energy from the plate is used to warm nearby surfaces in order to prevent moisture or frost buildup.

In some embodiments, the method involves measuring the position of a concentrated beam of solar energy by means of a grid of fine wires wherein thermal heating of the wires results in electrical resistance changes in the wires.

In some embodiments, a grid of fine wires is disposed across the path of a concentrated beam of solar energy to determine the position of the maximum intensity of the beam.

In still yet another aspect, a rocket propulsion system produces thrust for a spacecraft by directing a concentrated beam of solar energy into a solar absorber that heats a pressurized propulsion gas which is expelled through a rocket nozzle.

In some embodiments, the concentrated energy beam enters the propulsion system through a transparent window material that functions as a pressure window and may also include curved surfaces to provide a controlled amount of focusing of the energy beam.

In some embodiments, the energy beam passes through a second transparent window that is spaced away from the first window thereby forming a pressurized plenum chamber between the two windows into which a propulsion gas may be injected. The second window is further provided with an array of holes that allow pressurized gas to flow out of the plenum chamber into a further pressure chamber containing the solar absorber and a rocket nozzle. The array of holes form a turbulence-free protective gas barrier near the output surface of the second window.

In some embodiments, a first propulsion gas is injected into the plenum and a second propulsion gas is injected into the pressure chamber that contains a solar absorber. The first gas may be formulated to cool the windows and to chemically remove contaminants. The second gas may be a complex mixture of molecules that is derived from asteroid mining processes.

In another aspect, there is provided an apparatus for collecting solar energy and simultaneously protecting against damage from a resulting energy beam, the apparatus comprising: a solar energy collection system comprising at least one concentrator and a target configured to use, store, or convert the solar energy, the collection system configured to cause solar energy to focus on the target; at least one sensor configured to detect misalignment of the concentrator by determining that some or all of the collected solar energy is offset from the target; and a safety system configured to redirect the energy or interpose a safety structure for shielding other non-target systems from receiving too much solar energy from the collection system.

In some embodiments, the safety structure comprises one or more of the following: an optical shutter, a blocking plate, an absorber, a diffuser, and/or an optical element, and wherein the physical element is further configured to deflect and/or defocus the collected solar energy.

In some embodiments, the safety system is further configured to interpose the safety structure with a response time that is shorter than the time for thermal damage to occur in the non-target systems.

In some embodiments, the safety structure is further configured to receive the collected sunlight and radiate thermal energy in order to prevent moisture or ice build up on other portions of the solar power collection system.

In some embodiments, the at least one concentrator is configured to focus the solar energy, the solar energy collection system further comprises at least one reflector configured to reflect the solar energy focused by the at least one concentrator, and the at least one sensor comprises at least one camera having a field of view directed at the at least one reflector.

In some embodiments, the apparatus further comprises: one or more processors configured to: receive image data from the one or more cameras, detect a location of a diffuse glow with respect to the at least one reflector, and determine whether the focused solar energy is misaligned based on the detected location of the diffuse glow.

In some embodiments, the solar energy collection system further comprises: one or more actuators configured to adjust the position and/or rotation of the at least one reflector based on the determination of whether the focused solar energy is misaligned.

In some embodiments, the at least one concentrator is configured to focus the solar energy, the solar energy collection system further comprises at least one reflector configured to reflect the solar energy focused by the at least one concentrator, and the one or more sensors comprise a grid formed of a plurality of wires located adjacent to one of the at least one reflective elements.

In some embodiments, the apparatus further comprises: a circuit configured to measure electrical resistances of each of the plurality of wires, and one or more processors configured to: receive the measured electrical resistances from the circuit, and determine whether the focused solar energy is misaligned based on the measured electrical resistances.

In some embodiments, the solar power collection system further comprises: one or more actuators configured to adjust the position and/or rotation of the at least one reflector based on the determination of whether the focused solar energy is misaligned.

In yet another aspect, there is provided a spacecraft, comprising: an asteroid capture system configured to capture an asteroid; a solar power collection system configured to: collect solar energy from the sun, generate an energy beam from the collected sunlight, and redirect the energy beam into the captured asteroid, wherein the solar power collection system comprises one or more sensors configured to detect misalignment of the energy beam, the solar power collection system further configured to redirect the energy beam based on output of the one or more sensors.

In some embodiments, the solar power collection system further comprises: a physical element configured to selectively prevent the solar power collection system from forming the energy beam in response to the one or more sensors detecting misalignment of the energy beam.

In some embodiments, the physical element comprises one or more of the following: an optical shutter, a blocking plate, an absorber, a diffuser, and/or an optical element, and wherein the physical element is further configured to deflect and/or defocus the collected solar energy.

In some embodiments, the physical element is further configured to prevent the solar power collection system from forming the energy beam with a response time that is shorter than the time for thermal damage to occur in spacecraft structures.

In some embodiments, the physical element is further configured to receive the collected sunlight and radiate thermal energy in order to prevent moisture or ice build up on other portions of the solar power collection system.

In some embodiments, the solar power collection system further comprises: a lenticular structure having a curved reflective surface configured to collect the solar energy and focus the collected solar energy into the energy beam, and at least one reflecting element configured to redirect the energy beam.

In some embodiments, the one or more sensors comprise one or more cameras, the one or more cameras each have a field of view directed at one of the at least one reflecting element.

In some embodiments, the spacecraft further comprises: one or more processors configured to: receive image data from the one or more cameras, detect a location of a diffuse glow with respect to the one of the reflective elements, and determine whether the energy beam is misaligned based on the detected location of the diffuse glow.

In some embodiments, the solar power collection system further comprises: one or more actuators configured to adjust the position and/or rotation of the at least one reflecting element based on the determination of whether the energy beam is misaligned.

In some embodiments, the one or more sensors comprise a grid formed of a plurality of wires located adjacent to one of the at least one reflective elements.

In some embodiments, the spacecraft further comprises: a circuit configured to measure electrical resistances of each of the plurality of wires, and one or more processors configured to: receive the measured electrical resistances from the circuit, and determine whether the energy beam is misaligned based on the measured electrical resistances.

In some embodiments, the solar power collection system further comprises: one or more actuators configured to adjust the position and/or rotation of the at least one reflecting element based on the determination of whether the energy beam is misaligned.

In some embodiments, further comprising: a rocket propulsion system configured to provide rocket thrust, wherein the solar power collection system is further configured to redirect the energy beam into the rocket propulsion system.

In some embodiments, the rocket propulsion system comprises: a rocket nozzle, and a solar absorber configured to heat a pressurized propulsion gas and expel the heated pressurized propulsion through the rocket nozzle.

In some embodiments, the rocket propulsion system further comprises: a body enclosing the solar absorber, and a first transparent window configured to provide a pressure seal against the body and provide a controlled amount of focusing of the energy beam to the solar absorber.

In some embodiments, the rocket propulsion system further comprises: a second transparent window arranged within the body and spaced away from the first transparent window to form a pressurized plenum chamber between the first and second transparent windows, wherein the plenum chamber is configured to receive a first propulsion gas injected therein, wherein the second window has an array of holes formed therein configured to allow the first propulsion gas to flow out of the plenum chamber into a pressure chamber formed in the body and containing the solar absorber, and wherein the array of holes form a substantially turbulence-free protective gas barrier near an output surface of the second transparent window.

In some embodiments, the pressure chamber is configured to receive a second propulsion gas injected therein, the first gas is configured to cool and remove contaminants from the first and second transparent windows, and the second gas comprises a mixture of molecules derived from asteroid mining processes.

In still yet another aspect, a method for protecting a spacecraft against damage from an energy beam, comprising: collecting solar energy from the sun using a solar power collection system of the spacecraft; generating an energy beam from the collected sunlight using the solar power collection system; redirecting the energy beam into an asteroid captured by an asteroid capture system of the spacecraft; detecting misalignment of the energy beam using one or more sensors; and redirecting the energy beam using the solar power collection system based on output of the one or more sensors.

In some embodiments, the method further comprises: configured to selectively preventing the solar power collection system from forming the energy beam using a physical element in response to the one or more sensors detecting misalignment of the energy beam.

In some embodiments, the physical element comprises one or more of the following: an optical shutter, a blocking plate, an absorber, a diffuser, and/or an optical element, and wherein the physical element is further configured to deflect and/or defocus the collected solar energy.

In some embodiments, the method further comprises: preventing the solar power collection system from forming the energy beam using the physical element with a response time that is shorter than the time for thermal damage to occur in spacecraft structures.

In some embodiments, the method further comprises: receiving the collected sunlight and radiate thermal energy using the physical element in order to prevent moisture or ice build up on other portions of the solar power collection system.

In some embodiments, the method further comprises: collecting and focusing the solar energy using a lenticular structure having a curved reflective surface into the energy beam, and redirecting the energy beam using at least one reflecting element.

In some embodiments, the one or more sensors comprise one or more cameras, the one or more cameras each have a field of view directed at one of the at least one reflecting element.

In some embodiments, the method further comprises: receiving, at one or more processors, image data from the one or more cameras; detecting, at the one or more processors, a location of a diffuse glow with respect to the one of the reflective elements; and determining, using the one or more processors, whether the energy beam is misaligned based on the detected location of the diffuse glow.

In some embodiments, the method further comprises: adjusting the position and/or rotation of the at least one reflecting element using one or more actuators based on the determination of whether the energy beam is misaligned.

In some embodiments, the one or more sensors comprise a grid formed of a plurality of wires located adjacent to one of the at least one reflective elements.

In some embodiments, the method further comprises: measuring electrical resistances of each of the plurality of wires using a circuit; receiving, at one or more processors, the measured electrical resistances from the circuit; and determining, at the one or more processors, whether the energy beam is misaligned based on the measured electrical resistances.

In some embodiments, the method further comprises: adjusting the position and/or rotation of the at least one reflecting element using one or more actuators based on the determination of whether the energy beam is misaligned.

In some embodiments, the method further comprises: providing rocket thrust using a rocket propulsion system; and redirecting the energy beam into the rocket propulsion system.

In some embodiments, the method further comprises: heating a pressurized propulsion gas using a solar absorber; and expelling the heated pressurized propulsion through a rocket nozzle.

In some embodiments, the rocket propulsion system further comprises: a body enclosing the solar absorber, and a first transparent window configured to provide a pressure seal against the body and provide a controlled amount of focusing of the energy beam to the solar absorber.

In some embodiments, the rocket propulsion system further comprises: a second transparent window arranged within the body and spaced away from the first transparent window to form a pressurized plenum chamber between the first and second transparent windows, wherein the plenum chamber is configured to receive a first propulsion gas injected therein, wherein the second window has an array of holes formed therein configured to allow the first propulsion gas to flow out of the plenum chamber into a pressure chamber formed in the body and containing the solar absorber, and wherein the array of holes form a substantially turbulence-free protective gas barrier near an output surface of the second transparent window.

In some embodiments, the method further comprises: the pressure chamber is configured to receive a second propulsion gas injected therein, the first gas is configured to cool and remove contaminants from the first and second transparent windows, and the second gas comprises a mixture of molecules derived from asteroid mining processes.

Another aspect is a rocket propulsion system configured to provide rocket thrust, comprising: a solar absorber material; a rocket nozzle; and a solar power collection system comprising a first transparent window configured to allow one or more propulsive gases to pass therethrough, the solar power collection system configured to: collect solar energy from the sun, generate an energy beam from the collected sunlight, heat the solar absorber material to transfer heat to the one or more pressurized propulsive gases, and expel the heated pressurized propulsive gases through a rocket nozzle.

In some embodiments, the one or more pressurized propulsive gases are configured to: react chemically to produce heat, receive heat from the solar absorber material, and/or exit the rocket nozzle to produce thrust.

In some embodiments, the rocket propulsion system further comprises: a body enclosing the solar absorber, and a second transparent window configured to provide a pressure seal against the body and provide a controlled amount of focusing of the energy beam to the solar absorber.

In some embodiments, the rocket propulsion system further comprises: a third transparent windows arranged within the body and spaced away from the first and second windows, wherein a first pressurized plenum chamber is formed between the first and second transparent windows, and a second pressurized plenum chamber is formed between the first and third windows, and wherein the first plenum chamber is configured to receive a first propulsion gas injected therein, and the second plenum chamber is configured to receive a second propulsion gas injected therein.

In some embodiments, the first window has an array of hollow tubes formed therein and configured to allow the first propulsion gas to flow out of the first plenum chamber passing through the first transparent window, passing through the second plenum chamber, and passing through the third transparent window, into a pressure chamber formed in the body and containing the solar absorber, and wherein the propulsive gas flowing through the array of hollow tubes produces a substantially turbulence-free protective gas barrier near an output surface of the third transparent window.

In some embodiments, the third transparent window includes: a first array of through-holes which allow passage of the hollow tubes without substantial gas leakage around the outer surfaces of the hollow tubes, and a second array of through-holes which allow passage of the second propulsive gas from the second plenum chamber through the third transparent window into the pressure chamber formed in the body and containing the solar absorber, wherein the propulsive gas flowing through the array of first and second arrays of through-holes produces a substantially turbulence-free protective gas barrier near an output surface of the third transparent window.

In some embodiments, the propulsion chamber includes an electrical igniter to initiate chemical combustion in a mixture of chemically reactive propulsion gases.

In some embodiments, the propulsive gases include rocket propellant and oxidizer gases mixed with chemically inert gases (e.g., in various concentrations that may be configured to improve performance, convenience, and/or safety, for example).

In some embodiments, the solar energy and chemical combustion energy are employed simultaneously to heat propulsive gases.

In some embodiments, the rocket propulsion system is configured to transition from completely chemical combustion heating to combined solar-thermal plus chemical combustion to completely solar thermal heating without interrupting thrust.

Yet another aspect is a solar-thermal rocket motor, comprising: a pressurized rocket body; a plurality of transparent windows configured to admit a beam of concentrated solar energy into the pressurized rocket body, at least one of the transparent windows configured to allow a pressurized gaseous propulsion fluid to pass therethrough; a solar absorber located within the rocket body and configured to: absorb the solar energy beam thereby heating the solar absorber, and use thermal conduction to heat the pressurized gaseous propulsion fluid passing through the solar absorber; a combustion chamber configured to receive the heated pressurized gaseous propulsion fluid; a first injector tube configured to inject a gaseous combustible rocket propellant into the combustion chamber; a second injector tube configured to inject a gaseous oxidizer into the combustion chamber; and a rocket nozzle configured to: expel the heated pressurized gaseous propulsion fluid to produce rocket thrust, and expel any combustion gasses that may have resulting from igniting the gaseous combustible rocket propellant and the gaseous oxidizer in the combustion chamber to produce the rocket thrust.

In some embodiments, the rocket motor is further configured to operate in a solar mode by producing the rocket thrust by heating the pressurized gaseous propulsion fluid using the concentrated solar energy without combusting the gaseous combustible rocket propellant and the gaseous oxidizer.

In some embodiments, the rocket motor is further configured to operate in a combustion mode by producing the rocket thrust via combustion of gaseous combustible rocket propellant and the gaseous oxidizer in exothermic chemical reactions.

In some embodiments, the rocket motor is further configured to operate in combined mode by producing the rocket thrust via a simultaneous combination of heating the pressurized gaseous propulsion fluid using the concentrated solar energy and combustion of gaseous combustible rocket propellant and the gaseous oxidizer in exothermic chemical reactions.

In some embodiments, the first injector tube forms a first spiral tube in the combustion chamber, the second injector tube forms a second spiral tube in the combustion chamber, and the first and second spiral tubes are interleaved and thereby distribute and mix the gaseous combustible rocket propellant and the gaseous oxidizer in the combustion chamber.

In some embodiments, the first and second spiral tubes are spaced apart to allow the heated pressurized gaseous propulsion fluid to pass between them toward a nozzle opening from the combustion chamber.

In some embodiments, the rocket motor further comprises a cooling structure in thermal contact with the rocket motor body, the cooling structure configured to direct cooling fluid to absorb heat energy through thermal conduction as the cooling fluid flows therethrough.

In some embodiments, the rocket motor body contains the heated pressurized gaseous propulsion fluid is surrounded by a rigid pressurized shell spaced apart from the rocket motor body with a plurality of separator coils formed between the rigid pressurized shell and the rocket motor body.

In some embodiments, the rocket motor further comprises: a third injector tube configured to inject a gaseous fluid into passages defined by spaces between the separator coils, wherein the separator coils are configured to heat or cool the injected fluid and the rocket motor body.

In some embodiments, the rigid pressurized shell is configured to be detached and reattached from the rocket motor body to allow the separator coils to be replaced, and the separator coils are selected to provide cooling or heating based on a specific type of the gaseous rocket propellant.

Still yet another aspect is a hybrid rocket motor configured for multiple energy modes within a single rocket chamber immediately upstream from a nozzle, the motor comprising: a wall generally enclosing a hybrid rocket chamber; a first window forming part of the wall, the window configured to allow radiation to enter while helping contain heat energy; a second window spaced apart from the first window and configured to allow propellant to pass therethrough; a thermal mass positioned to absorb radiation after entry through the window; a pressurized gas inlet configured to introduce gas into the chamber such that the gas is heated by contact with the thermal mass; a manifold configured to mix combustible materials; and an igniter configured to ignite combustion in the combustible materials; the wall of the rocket chamber generally forming a frustoconical portion surrounding a propellant exit configured to allow pressurized gas and combustion byproducts to exit to the nozzle.

In some embodiments, the rocket motor further comprises: two additional pressurized gas inlets configured to introduce gas into the chamber, wherein the pressurized gas inlets are configured to introduce at least three propellant types into the chamber, the propellant types including: an inert gas and two volatile gasses when mixed in the chamber.

In some embodiments, the manifold comprises a plurality of interspersed openings configured to distribute the combustible materials within the chamber such that the combustible materials are substantially uniformly mixed.

In some embodiments, the thermal mass comprises a plurality of openings configured to allow the combustible materials to pass through the thermal mass, thereby allowing heat conduction between the thermal mass and the combustible materials.

In some embodiments, the chamber comprises a combustion region in which the igniter is configured to ignite the combustion in the combustible materials, the combustion region is located adjacent to the thermal mass such that the combustion of the combustible materials provides heat to the thermal mass, thereby providing the thermal mass with additional energy for conductive heating.

In some embodiments, the window is further configured to focus solar energy onto the thermal mass upstream of a combustion region within the chamber.

In some embodiments, the thermal mass comprises aggregate material sintered or confined together to create thermal contact and permitting fluid flow through open passages therein. The thermal mass can be configured for greater transparency to the solar energy in an upper layer and greater absorbance of the solar energy in a lower layer.

In some embodiments, the chamber comprises a plurality of zones of energy which increase as a distance between the zones and the nozzle decreases.

In some embodiments, the rocket motor further comprises: a second window arranged between the window and the thermal mass and forming a plenum between the window and the second window, the second window having a plurality of openings therein; a second inlet configured to introduce a second gas into the plenum, the second gas being cleaner than the gas introduced via the pressurized gas inlet, and a pump configured to use solar energy to pump the gas into and through the pressurized gas inlet into the chamber, wherein the openings in the second window are configured to allow the second gas to displace less clean material from within a predetermined distance of the second window, thereby deterring material build-up.

Another aspect is a solar-thermal rocket motor, comprising: a pressurized rocket body; at least one transparent window configured to admit a concentrated solar energy beam into the pressurized rocket body, the at least one transparent window configured to allow propellant to pass therethrough; a solar absorber configured to: absorb the solar energy beam, thereby causing the solar absorber to be heated, and establish a thermal profile to heat the propellant such that its heat increases as it passes through the solar absorber; a rocket nozzle; and a combustion chamber configured to: receive the heated propellant, and expel the heated propellant through the rocket nozzle to produce rocket thrust.

In some embodiments, the rocket motor further comprises: at least one injector configured to separately inject a gaseous combustible rocket fuel and a gaseous oxidizer into the combustion chamber; and an igniter configured to ignite the gaseous combustible rocket fuel and the gaseous oxidizer within the combustion chamber to produce pressurized combustion gases, wherein the combustion chamber is further configured to expel the pressurized combustion gases through the rocket nozzle to produce rocket thrust.

In some embodiments, the at least one injector is further configured to inject the propellant simultaneous with the gaseous combustible rocket fuel and the gaseous oxidizer.

In some embodiments, the solar absorber comprises a plurality of beads.

In some embodiments, the beads are dielectric and/or metal. The beads can be arranged in layers to establish the thermal profile, with beads having similar absorption properties grouped at successive levels within the solar absorber.

In some embodiments, the beads are made from refractory materials in a plurality of shapes, sizes, colors, and/or optical transparencies. In some embodiments, the beads are configured to establish the thermal profile by allowing solar energy to penetrate through at least some surface portions of the solar absorber, reducing heat of the surface portions, and be absorbed by deeper portions thereof, increasing heat of the deeper portions.

In some embodiments, a number and type of the beads are chosen and assembled into a volume designed to absorb substantially a total input energy of the solar energy beam commensurate with a rocket of a predetermined power level.

In some embodiments, a portion of the beads are formed from and/or coated with a catalytic material to promote a controlled exothermic dissociation of a monopropellant propulsion gas into one or more lower atomic weight gases.

These and other features and advantages of the present disclosure will be apparent to those skilled in the art from the following detailed description, taken together with the accompanying drawings, in which like reference numerals refer to like parts.

DETAILED DESCRIPTION

When launching spacecraft by rockets (e.g., from the surface of the Earth), the spacecraft are typically carried within the aerodynamic nose cone of the launch vehicle. It is desirable to reduce launch costs by minimizing both the total mass of the spacecraft and its physical size. It is therefore useful to employ compact and light-weight structures wherever possible. As used herein, light-weight structures may generally refer to structures having a sufficiently low weight such that the structures can be launched from the Earth to escape from the gravitational influence of Earth using one or more rockets.

Aspects of this disclosure relate to systems and techniques for collecting solar energy and protecting against damage resulting from an energy beam formed form the collected solar energy. Although examples of such systems and techniques are described in connection with an asteroid mining spacecraft, aspects of this disclosure are not limited thereto. For example, the systems and techniques described herein can also be applied to solar collection systems that are installed temporarily or permanently on an asteroid or a moon. As described herein, there may be situations in which focused solar energy may have sufficient power to damage components which do not form part of the optical path for the solar energy, for example, due to misalignment of one or more components in the system. Thus, aspects of this disclosure can provide systems and techniques for preventing such damage from occurring in many different solar energy collection systems.

Figure 1:
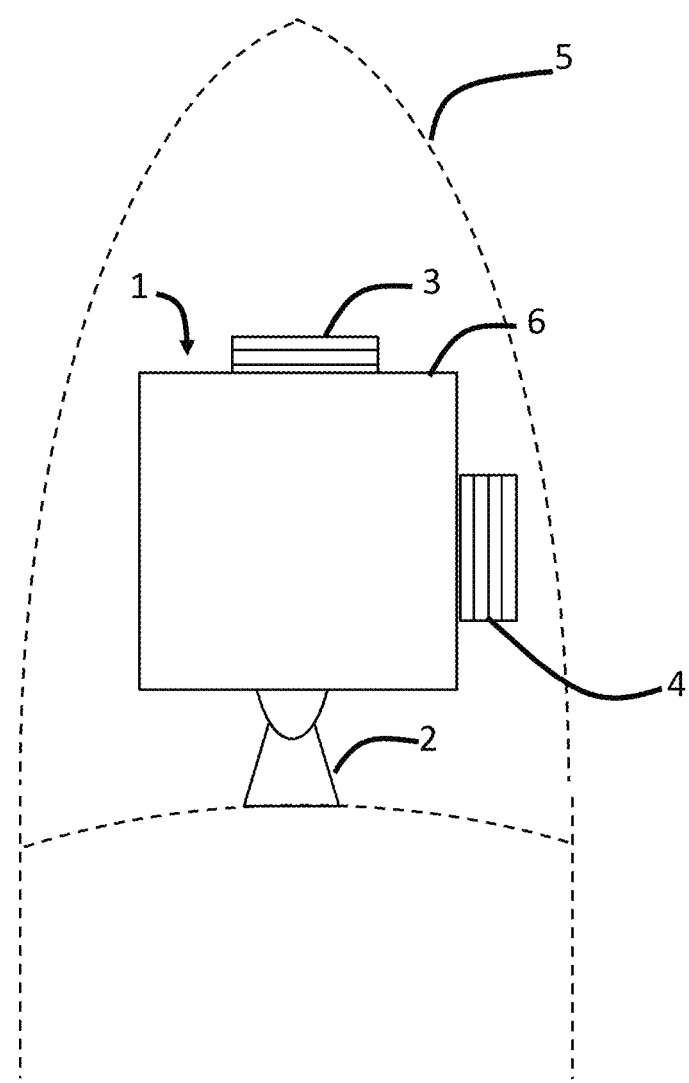
FIG. 1 is a schematic illustration of an embodiment of a spacecraft installed within a launch vehicle, wherein the various light-weight structures of the spacecraft are folded into compact configurations in accordance with aspects of this disclosure.

FIG. 1 illustrates an embodiment of an asteroid mining spacecraft, which can be positioned atop a launch rocket 5 (also referred to as a booster rocket) in accordance with aspects of this disclosure. The main body 6 of the spacecraft 1, also called the bus 6, contains the fuel, electrical components, and communication equipment for a typical mission. The spacecraft 1 is further provided with one or more rocket propulsion systems 2 configured to provide maneuvering capability to allow the spacecraft 1 to reach and capture passing asteroids. The spacecraft 1 also contains an asteroid capture system 3 and a solar power collection system 4, both of which are shown in a folded and stowed configuration in FIG. 1. The booster rocket 5 is shown schematically by dashed lines.

Figure 2:
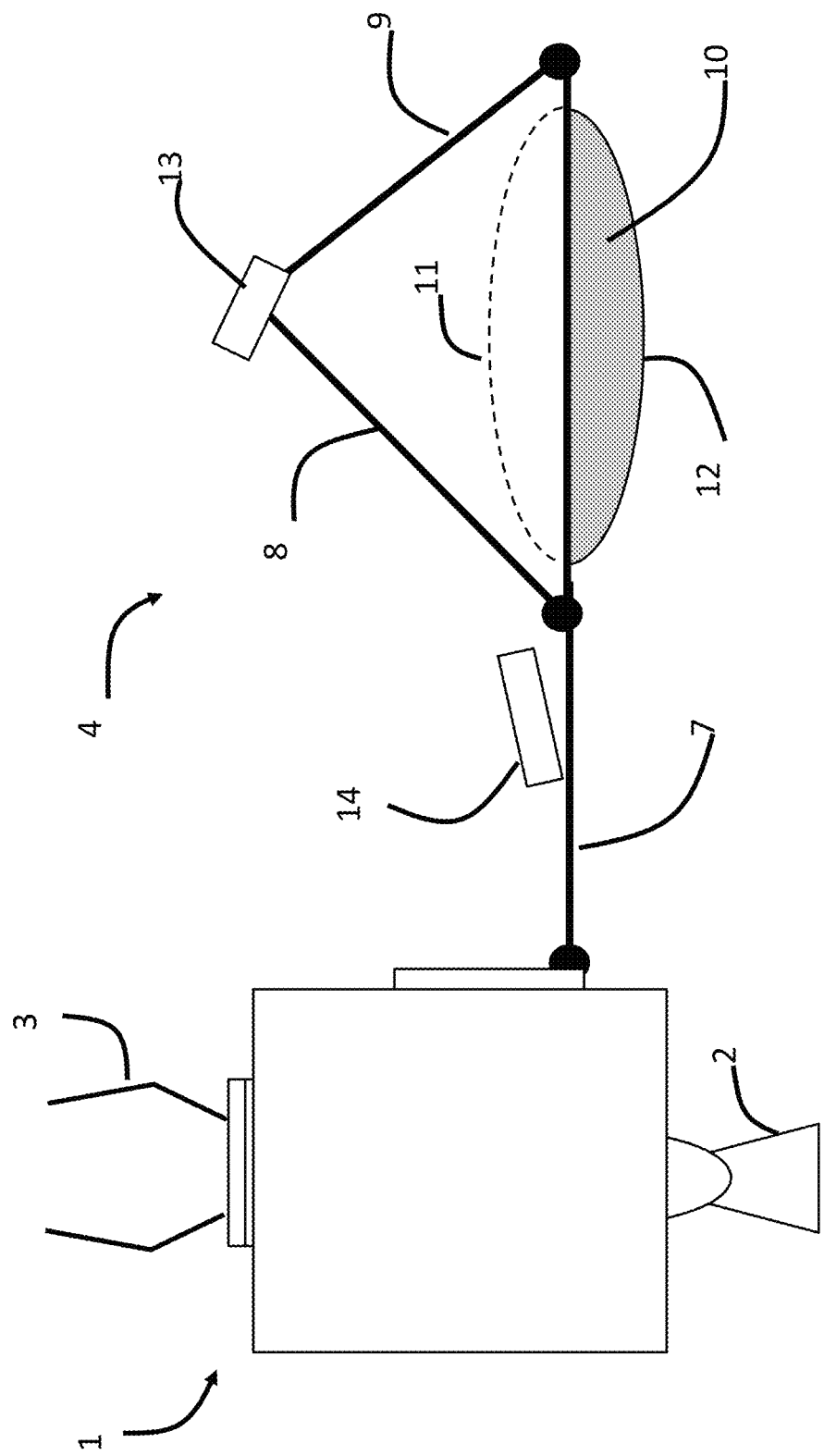
FIG. 2 is a schematic illustration of the orbiting spacecraft, wherein lightweight structures have been unfolded and deployed to operational configurations in accordance with aspects of this disclosure.

FIG. 2 depicts an embodiment the asteroid mining spacecraft 1 in orbital flight after it has separated from the booster rocket 5 in accordance with aspects of this disclosure. The asteroid capture system 3 is shown in a deployed configuration. In certain embodiments, the asteroid capture system 3 may include a plurality of multiply-jointed rigid members or may include a plurality of hollow tubular polymer membranes which have been inflated by internal gas pressure. However, aspects of this disclosure are not limited thereto and in other embodiments the asteroid capture system 3 can include other structure member(s) configured to be deployed in order to capture and contain asteroids.

With continued reference to FIG. 2, the solar power collection system 4 is shown after it has been unfolded and deployed from its compact stowed configuration. In certain implementations, the solar power collection system 4 comprises a plurality of linear support elements 7, 8, and 9 which may be embodied as tubular polymer membranes that have been inflated and held rigid by internal pressurizing gas. The solar power collection system 4 further comprises a hollow lens-shaped or inflated lenticular structure 10 which provides a transparent upper surface 11 and a curved reflecting lower surface 12. The lower surface 12 is configured to serve as a curved mirror to collect and focus incoming solar radiation. The solar power collection system 4 further comprises rigid reflecting elements 13 and 14 and may further include additional optical elements (not shown) which can be used to direct a focused energy beam.

Figure 3:
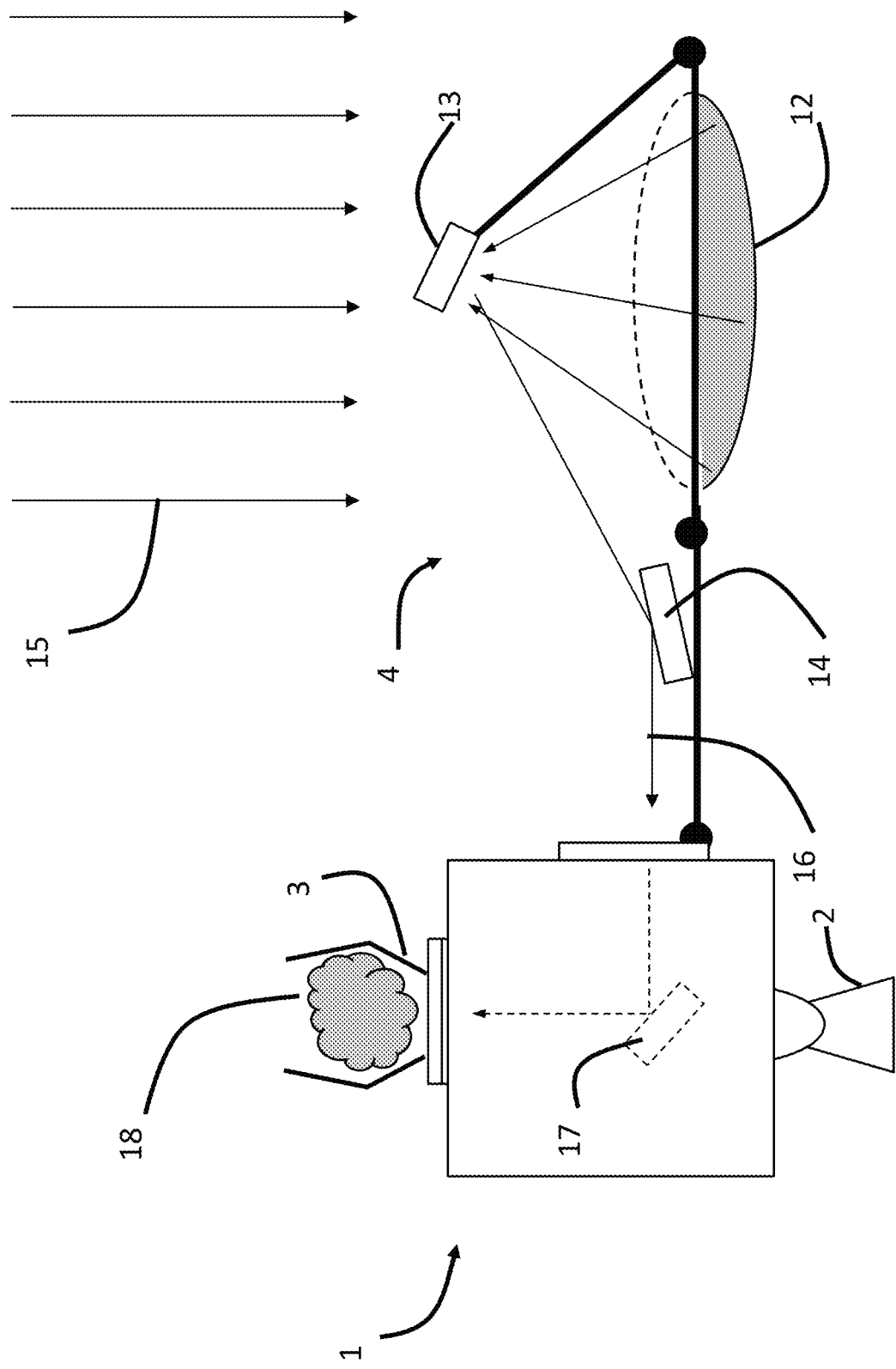
FIG. 3 is a schematic illustration of the collection and concentration of solar energy by light-weight reflecting structures in accordance with aspects of this disclosure.

FIG. 3 illustrates an embodiment of the solar power collection system 4 configured to collect solar energy and focusing the solar energy into a powerful energy beam. When the collecting curved mirror 12 is pointed directly at the Sun, a portion of the incoming solar radiation 15 reflects from the curved surface 12 and converges toward a secondary mirror 13.

With an unobstructed view of the Sun, the collection of solar energy using the configuration illustrated in FIG. 3 can collect very large power beams. For example, in an embodiment in which the mirror 12 has a collecting area of about 1 square meter, the continuous power collected can exceed one kilowatt of thermal energy for spacecraft at Earth's orbital distance from the Sun. When this energy is focused to a spot of several centimeters in diameter, the beam can have sufficient power density to drill a hole into concrete or into a captured asteroid. In certain implementations, collecting mirrors 12 having an area larger than about 1 square meter and multiple mirror configurations can collect proportionally larger power beams.

The additional rigid reflecting elements 13 and 14 are configured to adjust the focus and direction of the concentrated energy beam 16. Energy beam 16 can be directed into the spacecraft 1 via the rigid reflecting elements 13 and 14. The solar power collecting system 4 can further include one or more additional optical elements 17 configured to direct the beam 16 to pass through the spacecraft 1 to the asteroid capture system 3 and to impinge upon a captured asteroid 18. The concentrated solar energy can be used to drill holes into the asteroid, to melt and vaporize volatile constituents of the asteroid material, and to cause spalling and excavation of the asteroid surface. Thus, as used herein, the high power energy beam 16 may refer to an energy beam having sufficient power to drill a hole into the captured asteroid, to melt and vaporize volatile constituents of the asteroid material, and/or to cause spalling and excavation of the asteroid surface.

It can be seen from the above description that it is desirable to carefully focus a powerful energy beam 16 and direct the energy beam 16 to avoid hitting and damaging parts of the spacecraft 1 structure. That is, the energy beam 16 may have sufficient power to damage the spacecraft 1 if a portion of the beam 16 is inadvertently misdirected and strikes components of the spacecraft 1 which do not form part of the solar power collecting system 4. There are several conditions that may affect a dynamic misalignment of the beam 16. A non-exhaustive list of these conditions includes, for example, errors in pointing reflecting mirror 12 directly at the sun, mechanical deformations of light-weight structures 3 and 7-12 due to spacecraft 1 maneuvering forces, and/or slowly changing dimensions of the structures 3 and 7-12 due to material fatigue and/or due to pressurization loss caused by micro meteor impacts.

Therefore, it is desirable to provide techniques for continually monitoring the position and focus of energy beam 16. It is also desirable to incorporate shutters which can safely block or prevent the formation of an energy beam 16 during solar alignment maneuvers. It is also desirable to quickly block the energy beam 16 should there be unexpected upsets in any of the spacecraft control systems, a so called "dead man" automatic safety shutdown system.

In various embodiments of this disclosure, the spacecraft 1 can include one or more sensors configured to generate signals indicative of the alignment, misalignment, and/or degree of alignment of the energy beam 16. For example, solar power collecting system 4 can use the signals generated by the sensor(s) to realign one or more of the optical components that redirect the energy beam 16 in order to ensure that the energy beam 16 is not directed at other portions of the spacecraft 1. The one or more sensors may be configured to provide data for pointing and tracking information for solar power collection and may also provide warning alerts and shutdown commands whenever the energy beam 16 points in potentially damaging direction.

The one or more sensors can be implemented by various different embodiments. For example, the one or more sensors can use or be embodied as video camera(s) 19 as described in connection with FIG. 4 below. In some implementations, the sensor(s) can use or be embodied as a grid of fine wires 26 as described in connection with FIG. 7 below.

Figure 4:
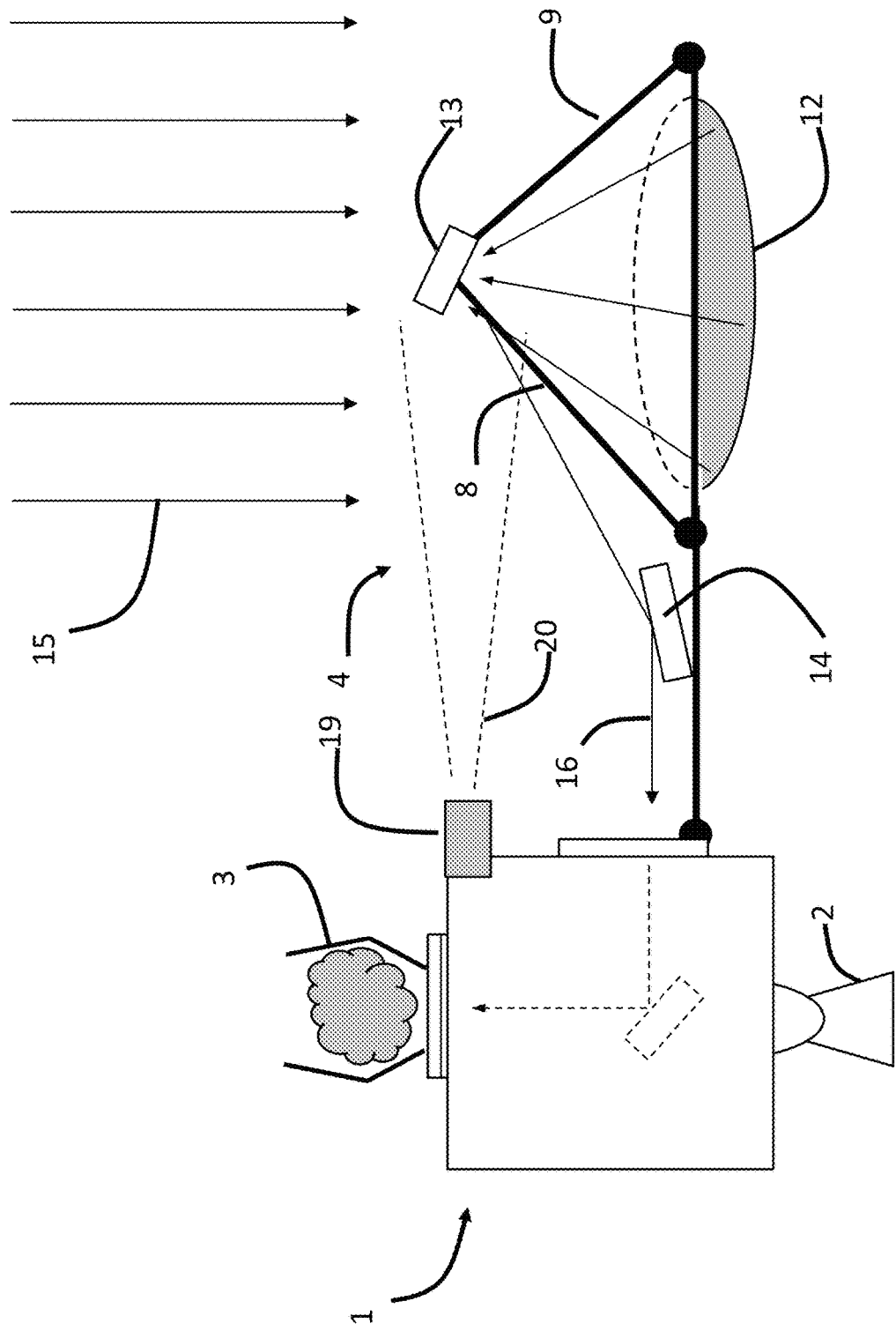
FIG. 4 illustrates a camera used to image the position of an energy beam on a polished optical surface in accordance with aspects of this disclosure.

Referring to FIG. 4, the spacecraft 1 includes a video camera 19 which may be placed in a convenient location upon the spacecraft body 1 or upon a supporting structure 7, 8, or 9. The camera 19 has a field-of-view 20, shown by broken lines in FIG. 4, which is directed to view the surface of reflecting element 13 while being simultaneously well away from the energy beam 16. If reflecting element 13 were a perfect mirror, none of the collected light in energy beam 16 would be scattered toward the camera 19. As a practical matter, virtually all polished mirrors diffusely scatter at least a small percentage of incident light into non-specular directions. Accordingly, the image seen by the camera 19 will be a diffuse glow located upon a region of the surface of element 13. If curved reflector 12 is perfectly aligned toward the incoming rays of sunlight 15, then the camera 19 image of the diffuse glow will be centered upon element 13. However, in the event that there is a small pointing error in the alignment of reflector 12, then the image glow will be displaced from the center of element 13. A displacement of the glow is an early warning measure of potentially damaging misalignment of the energy beam 16. Image processing software can readily detect the displacement of the glow image and provide signals to adjust the pointing direction of reflector 12. For example, in certain embodiments, the camera 19 may include one or more processors configured to run the image processing software in order to detect displacement of the glow image. In other embodiments, the spacecraft 1 can include one or more processors separate from the camera 19 configured to run the image processing software.

In a like manner, additional imaging cameras (not illustrated) may be placed to detect misalignments of the energy beam 16 on other reflecting surfaces along the path of the energy beam 16. Misalignment measurements at each imaged reflecting element can be used to correct the pointing accuracy of the preceding element in the optical path. Misalignment measurements by a plurality of imaging cameras can provide continuous adjustment of the high energy beam 16 during operation without requiring a system shutdown for calibration. In certain implementations, each of the plurality of cameras may include its own set of one or more processors configured to run image processing software to detect displacement of the respective glow images. In other implementations, each of the plurality of cameras may provide image data to one or more processors separate from the cameras which run the image processing software for each of the received video feeds.

Figure 5:
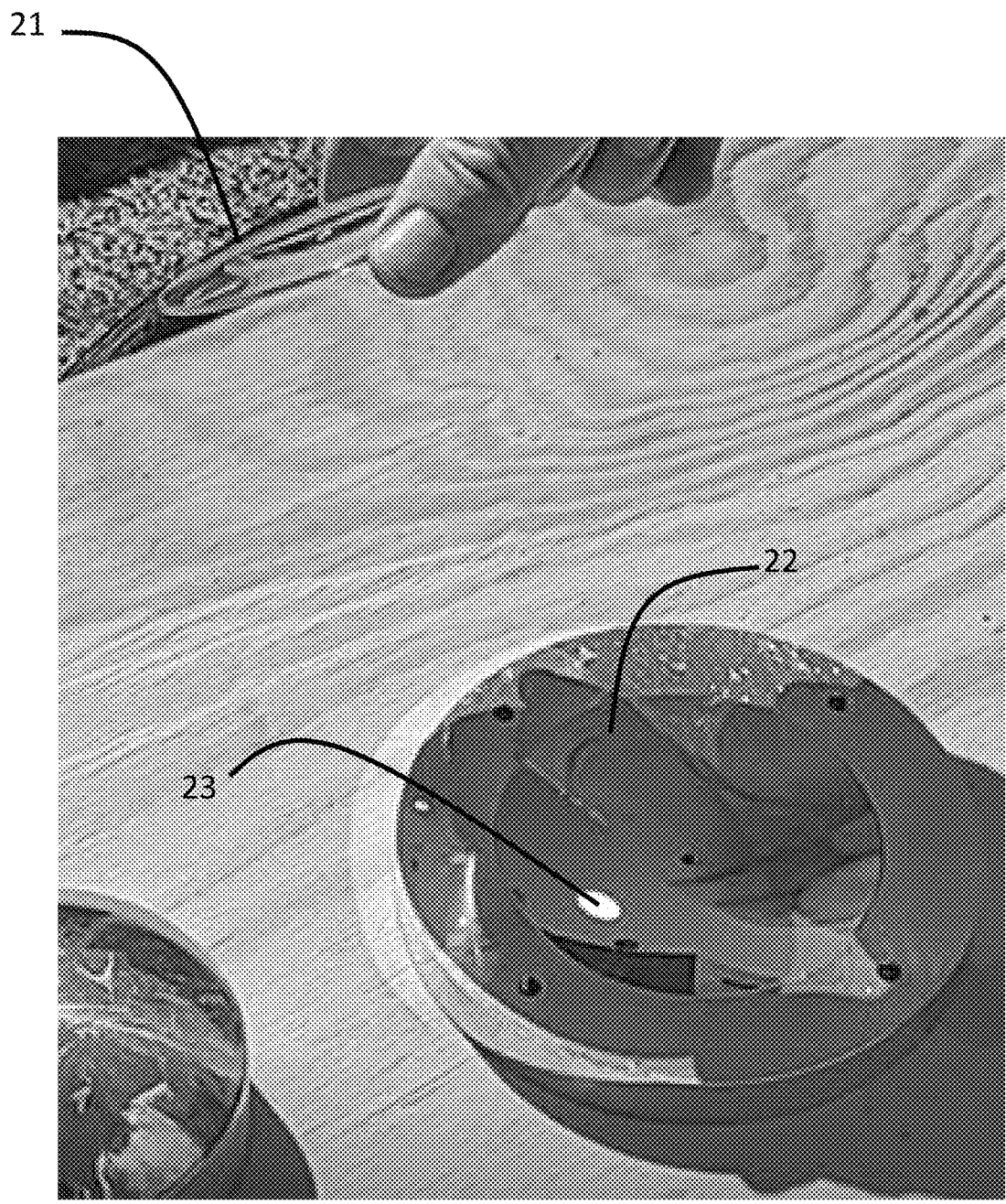
FIG. 5 is a photograph of scattering of high intensity light from a polished surface in accordance with aspects of this disclosure.

FIG. 5 is a photograph of the diffuse glow image upon a polished mirror in accordance with aspects of this disclosure. In this image, concentrated sunlight from a lens 21 is reflected from a concave mirror surface 22. The camera taking the image has been positioned to avoid the strong specular reflection. The diffuse glow can be clearly seen as a spot of light 23 that is not centered on the polished mirror.

Figure 6:
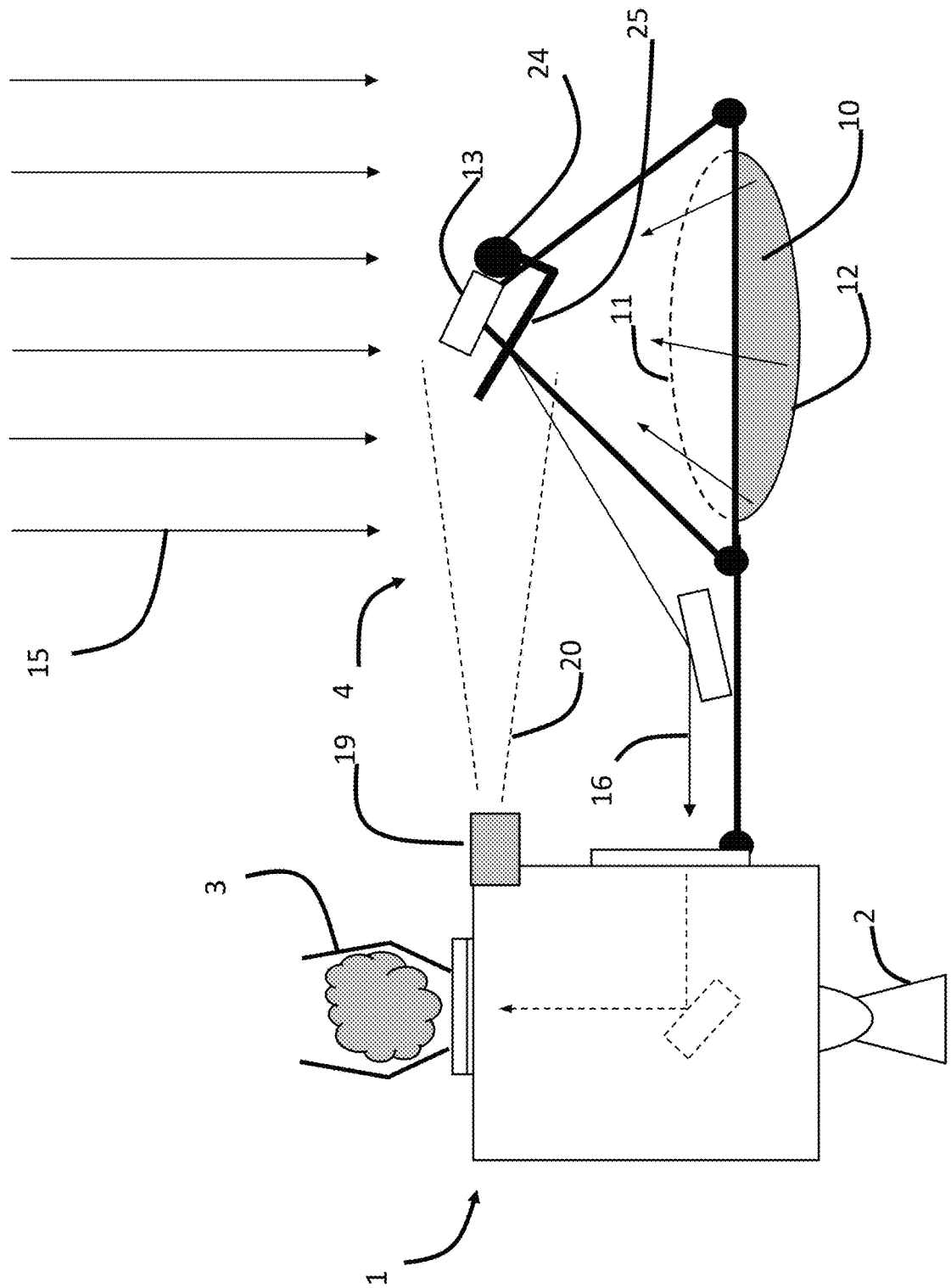
FIG. 6 illustrates a protective hinge and cover plate that can interrupt the formation of an energy beam in accordance with aspects of this disclosure.

Referring to FIG. 6 in a second embodiment, the spacecraft 1 includes a hinge 24 and cover plate 25 affixed to cover the front surface of reflecting element 13. In this configuration, converging rays from curved reflector 12 are prevented from reflecting and combining to form energy beam 16. Depending on the surface reflectance of cover plate 25, the incident light will be partially absorbed and partially diffusely reflected. As in the first embodiment of FIG. 4, the camera 19 will image a diffuse glow upon the surface of cover plate 23. The image position of the glow spot on the surface of the cover plate indicates the accuracy of alignment of curved surface 12 to the incoming solar energy 15 without requiring a reflection from element 13. In this manner, the curved surface 12 can be accurately aligned to the direction of the sun before a powerful energy beam 16 is directed further into the spacecraft 1. Furthermore, the curved surface 12 may be accurately aligned in the direction of the sun without need for a separate sun tracker or sun observing device.

With continued reference to FIG. 6 with the cover plate 25 in the blocking position as shown, a significant amount of solar energy 15 can be absorbed by the cover plate 25 thereby causing its temperature to rise. As the plate 25 heats, it will radiate long wavelength thermal energy in all directions. Nearby structures, such as the lenticular structure 10 with the transparent upper surface 11 will intercept a portion of the radiated thermal energy and also begin to warm. In this manner, lenticular structure 10 and other surfaces can be warmed as needed to prevent moisture or ice build that could potentially degrade the optical performance of these components. Since moisture may be produced during asteroid mining operations, it is desirable to heat optical surfaces as needed.

In some implementations, the cover plate 25 may be replaced or supplemented with another type of physical blocking element. For example, the physical blocking element may include one or more of the following: optical shutter(s), blocking plate(s), absorber(s), diffuser(s), and/or optical element(s) configured to deflect or defocus the energy beam 16.

Figure 7:
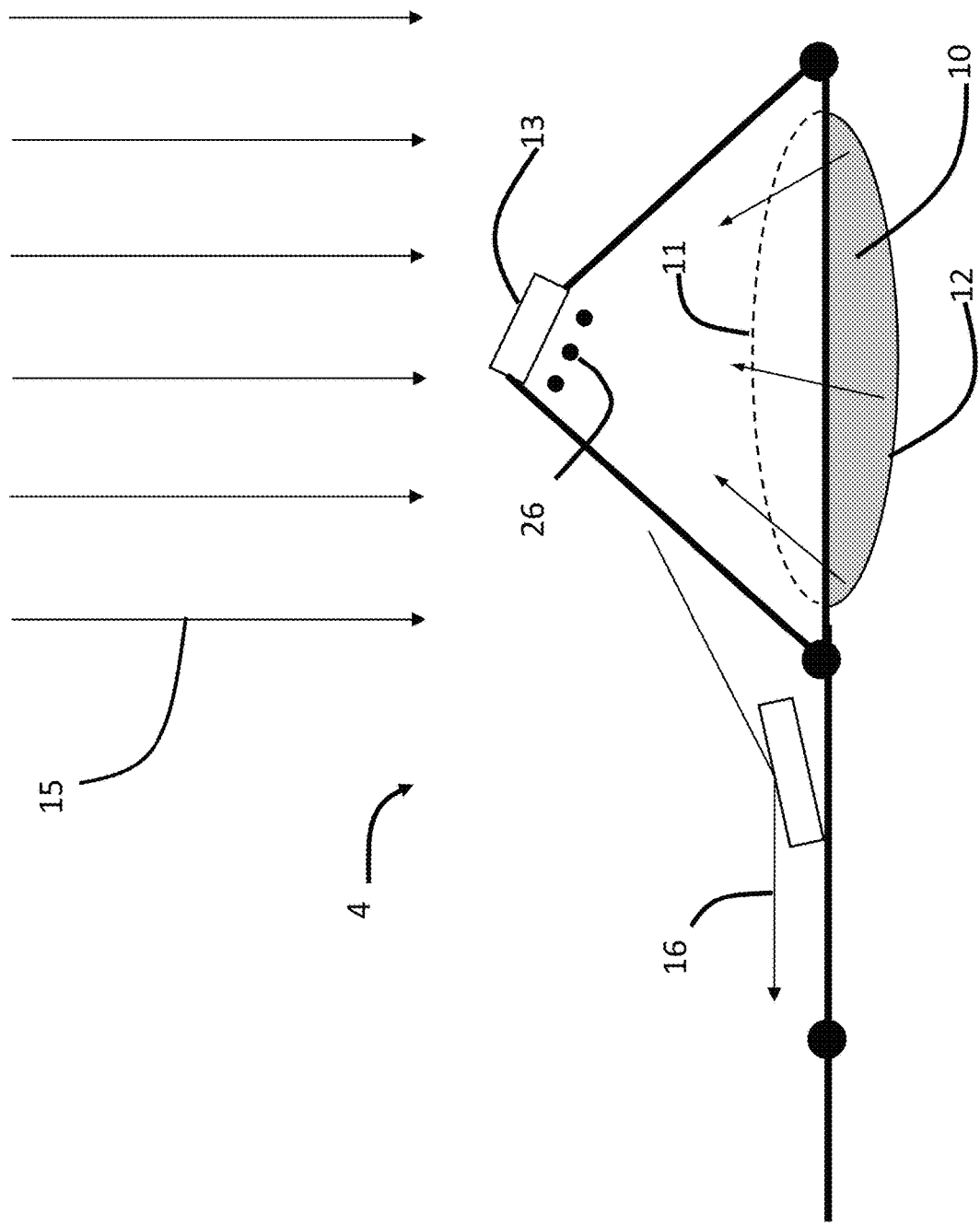
FIG. 7 illustrates a wire-grid sensor for measuring the centroid of a high energy beam of solar energy in accordance with aspects of this disclosure.

FIG. 7 illustrates a third embodiment of the solar power collection system 4 in accordance with aspects of this disclosure. As shown in FIG. 7, the solar power collection system 4 includes a grid of fine wires 26 placed near the reflecting surface of reflecting element 13. The wires 26 can be fabricated from materials which can tolerate high temperatures, such as tungsten or stainless steel. The wires 26 may have small diameters such as about 0.001 inch. The fine wires 26 intercept a small percentage of the converging solar radiation that is incident upon the reflecting element 13 and begin to warm. As the wires 26 are heated, their electrical resistance will increase. The wires closest to the center of the energy beam 16 will exhibit the largest resistance increases. The solar power collection system 4 can include one or more circuit configured to measure the resistance difference between adjacent wires 26, which provides information about directional misalignment of the energy beam 16. Very small resistance differences may be accurately measured by a common electrical circuit known as a Wheatstone Bridge. One or more processors may be configured to determine whether the energy beam 16 is misaligned based on the measured electrical resistances and provide control signals for repositioning and/or rotating the optical elements 10, 13, 16, 17 to correct the misalignment of the energy beam 16.

The solar power collection system 4 can include one or more actuators (not illustrated) configured to reposition and/or rotate one or more of the optical elements 10, 13, 16, 17 that generate and/or redirect the energy beam 16. Thus, the solar power collection system 4 can use the outputs received from the camera(s) 19 and/or the wires 26 as an input to control the alignment of the optical elements 10, 13, 16, 17 to ensure that the beam 16 is not directed onto any unintended components of the spacecraft 1, and thus, does not damage any components of the spacecraft 1.

Figure 8:
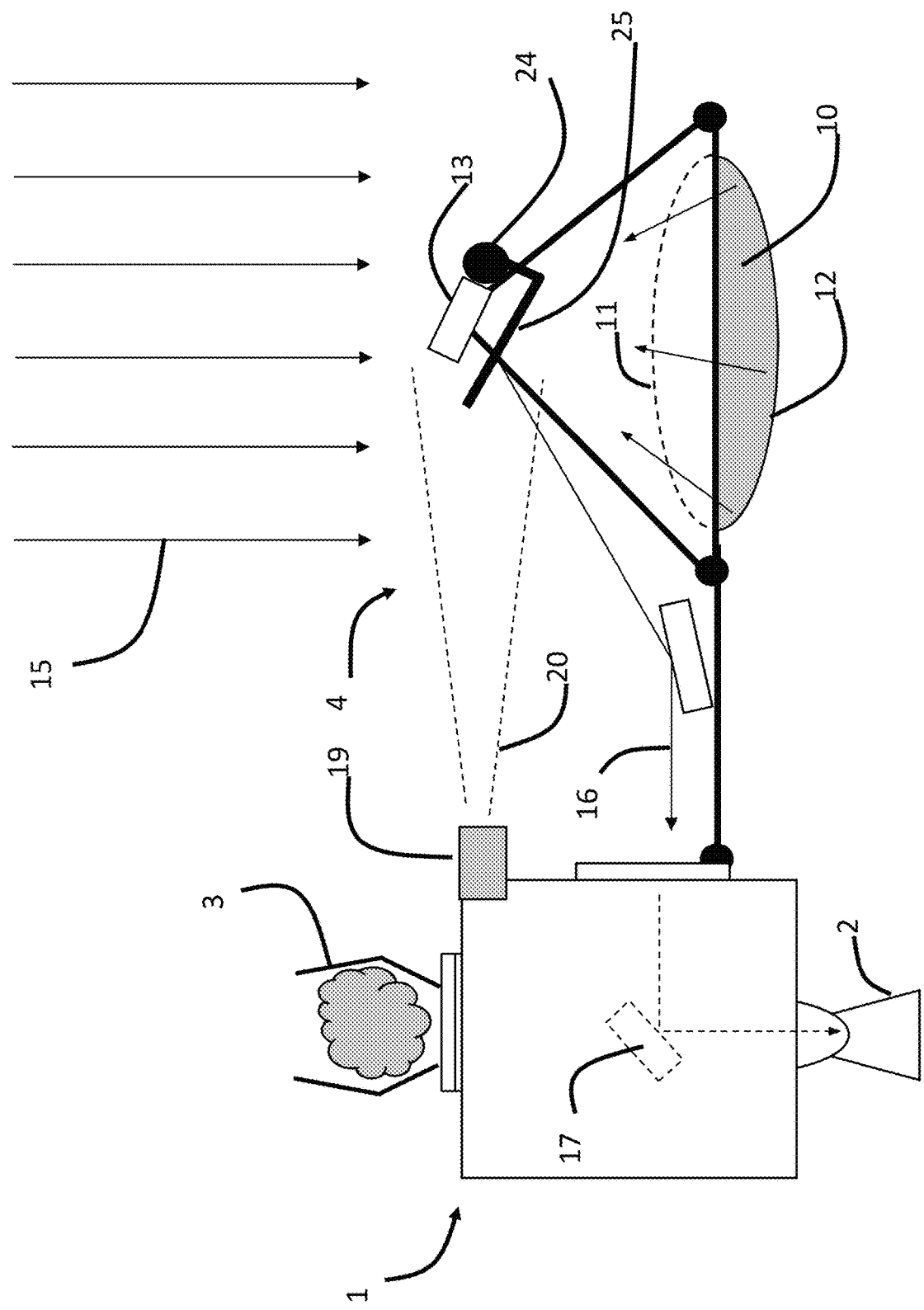
FIG. 8 illustrates an embodiment in which a turning mirror is configured to be rotated to direct the energy beam toward the rocket propulsion system in accordance with aspects of this disclosure.
Figure 9:
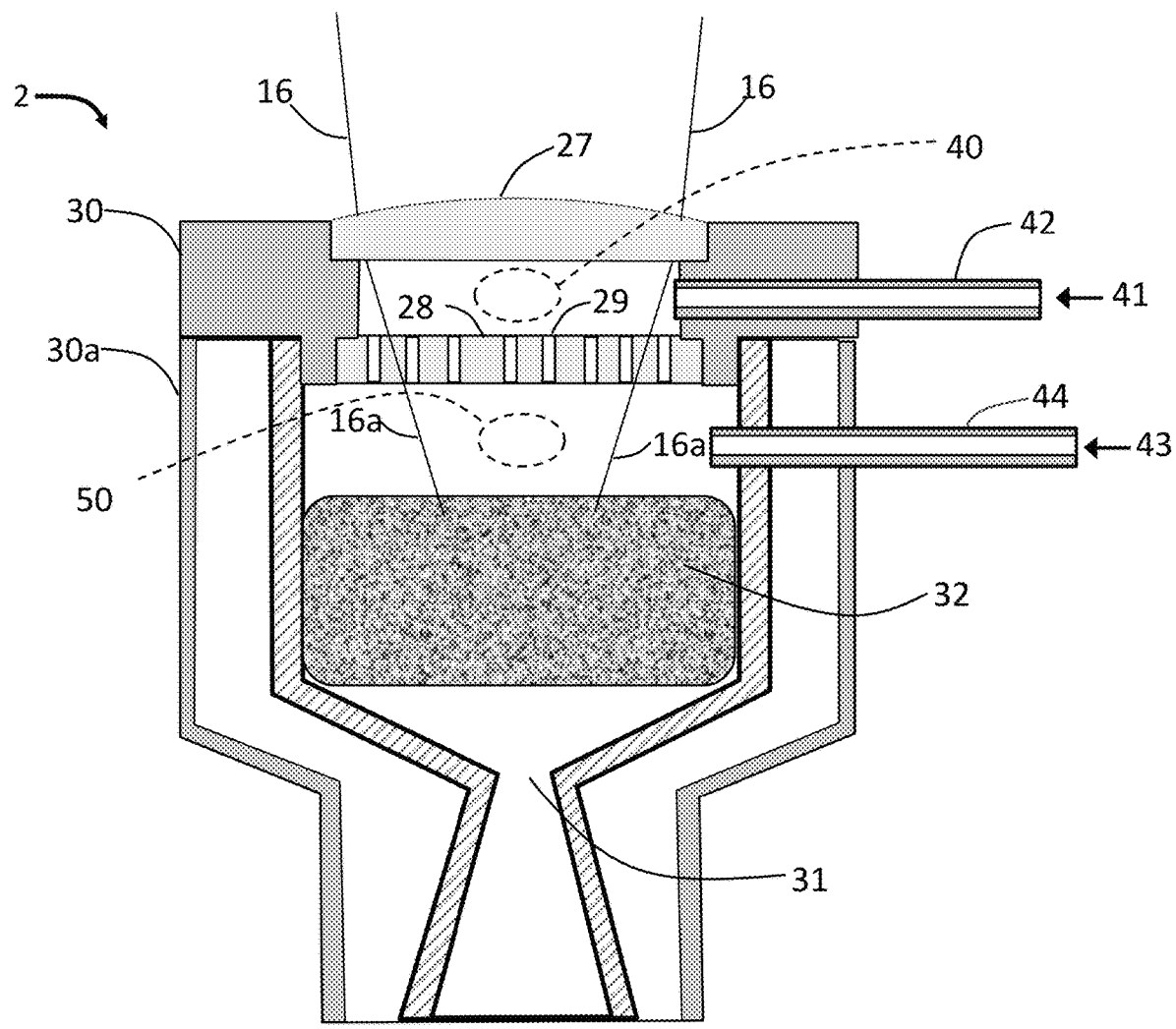
FIG. 9 illustrates internal structures of the rocket propulsion system in accordance with aspects of this disclosure.

FIG. 8 illustrates an embodiment in which a turning mirror 17 is configured to be rotated to direct the energy beam 16 toward the rocket propulsion system 2 in accordance with aspects of this disclosure. FIG. 9 illustrates internal structures of the rocket propulsion system 2 in accordance with aspects of this disclosure.

With reference to FIGS. 8 and 9, optical element 17 is embodied as a turning mirror 17 which can be rotated to selectively direct the energy beam 16 toward the rocket propulsion system 2 instead of towards the asteroid capture system 3. For example, the turning mirror 17 may be coupled to an actuator (not illustrated) configured to rotate the turning mirror 17 between a first orientation (e.g., as shown in FIG. 3) and a second orientation (e.g., as shown in FIG. 8).

The energy beam 16, represented in FIG. 9 within boundary rays, enters the rocket propulsion system 2 through two transparent windows 27 and 28. A first window 27 forms a pressure seal against components of the rocket propulsion system body 30 and 30a. The window 27 may have flat or curved surfaces forming a focusing lens. To reduce undesired optical reflections, one or both surfaces of the first window 27 may be coated with anti-reflection coatings.

The first window focuses and converges the energy beam 16 into a focused converging energy beam 16a, represented within boundary rays. The focused converging energy beam 16a passes through a second transparent window 28 and then into a solar absorber 32. The solar absorber (or a structure filling a similar role) can be configured to absorb radiation or energy from other sources. Thus, it can be considered an energy absorber. However, for convenience it will typically be referred to as a solar absorber.

The rocket propulsion system 2 is configured to heat a pressurized propellant gas to a high temperature and then expel the gas through a converging-diverging rocket nozzle 31 in order to produce useful rocket thrust. It is a general physical principle that most suitable propellant gasses are substantially transparent to solar energy. Thus, the gas will not efficiently absorb the wavelengths present in solar light.

The solid bulk material of solar absorber 32 is designed to be an efficient absorber of solar energy, e.g., provided by the energy beam 16a. The incoming energy beam 16a heats the solar absorber 32 to a high temperature, typically on the order of 2000 degrees Celsius. The solar absorber 32 is also porous to allow the flow of propellant gasses through the solar absorber 32. The solar absorber 32 also contains a large internal surface area which, by heat conduction, efficiently transfers heat energy from the bulk material of the solar absorber 32 to the propellant gas. Although the solar absorbers 32 are described in the context of absorbing solar energy from the Sun, the solar absorber 32 may also be configured to absorb other types of concentrated radiation including, for example, laser radiation, microwave radiation, etc.

Highly concentrated solar energy in a small volume can produce temperatures far higher than the melting point of all known solid materials. Therefore, the focusing properties of first window 27 may be chosen to limit the concentration of solar energy to temperatures within the safe operating limits of the solar absorber 32 and the surrounding structures 30a.

The second window 28 is spaced away from first window 27 by a predetermined distance. In some implementations, the distance between the first and second windows 27 and 28 may be on the order of 1 centimeter, however, in other implementations, the distance may be greater or less than 1 centimeter. In one illustrative embodiment, the distance may be 20 centimeters. In certain embodiments, the volume 40 contained between the two windows 27 and 28 forms a plenum configured to hold a pressurized propulsion gas. A first propulsion gas 41 can be injected into the plenum 40 through a first injector tube 42. In some embodiments, the second window 28 can include a plurality of small throughholes 29 which permit the first propulsion gas 41 to uniformly flow through window 28 into the volume of thrust chamber 50 in a two-dimensional pattern of linear jets.

One purpose of the first propulsion gas 41 is to provide cooling for both windows 27 and 28. The cooling gas reduces undesirable thermal stresses on both windows. Cooling reduces the probability of window fractures. Furthermore, cooling permits anti-reflection coatings to be applied to both windows, thereby increasing optical efficiency. Antireflection coatings generally have temperature limits that are lower than the temperature capabilities of solid materials and cannot be applied to excessively hot surfaces.

Similarly, a second propulsion gas 43 can be injected through a second injector tube 44 into the thrust chamber 50. Both of the gases 41 and 43 can be driven by their supply pressures to flow through the solar absorber 32 and into the rocket nozzle 31. The temperature of the gases 41 and 43 and their thermal energy content (enthalpy) can be greatly increased by passage through the solar absorber 32 (e.g., which provides heat from the energy beam 16a to the gases 41 and 43). The rocket nozzle 31 efficiently converts the random thermal motion and the relatively slow flow-velocity of hot gas molecules into linear motion in a high-speed exhaust plume, thereby producing rocket thrust.

The use of the two windows 27 and 28 and two injection gasses 41 and 43 provides a number of advantages over other thruster systems. One advantage is that many different types of gasses can be used to produce thrust in the rocket propulsion system 2. Examples of gases that can be used in the rocket propulsion system 2 include but are not limited to: $H_2$, $H_2O$, $HF$, $Ar$, $Cl_2$, $Br$, $CO_2$, $N_2$, $NH_3$, $CH_4$, mixtures of these gases, and a variety of volatile hydrocarbon molecules. Such gases can be derived directly from asteroid mining operations.

Another advantage is that many gas mixtures, when subjected to intense photochemical and thermochemical processes, may dissociate and recombine to produce opaque compounds. It is undesirable to allow opaque compounds to settle on the transparent window surfaces where they can block the energy beam 16. By injecting a relatively cool first propulsion gas 41 through the multiple holes 29 in the second window 28, a gas barrier can be formed near the surface of the second window 28. The outflow of the gas 41 can prevent turbulent gas flow from the propulsion gases 41 and 43 and various contaminants due to solar absorber 32 reactions from reaching and contaminating the second window 28.

When exposed to extreme temperatures, some gases including $CH_4$ are known to deposit carbon compounds on nearby surfaces. This process is known as coking. According to aspects of the present disclosure, coking deposits may be removed by periodically injecting cleaning gasses such as $H_2$, $HF$, or $Cl_2$ singly or in combination through injection ports 42 and/or 44, providing yet another advantage to aspects of this disclosure.

Solar Thermal and Chemical Hybrid Rocket

In traditional chemical rocket engines, a gaseous fuel is mixed with a gaseous oxidizer and ignited in the combustion chamber of a rocket engine. The resulting pressurized high temperature gas is exhausted through a converging-diverging rocket nozzle to produce rocket thrust. The energy contained in the rocket exhaust comes primarily from thermal energy released in the combustion process.

In a solar thermal rocket, a chemically inert propulsion gas is introduced into a thrust chamber, similar in shape to the combustion chamber of a chemical rocket. Solar energy external to the spacecraft is collected and concentrated by various mirrors and/or lenses into an intense energy beam. The energy beam is directed into the propulsion chamber where the energy beam heats the propulsion gas. The resulting pressurized high temperature gas is exhausted through a rocket nozzle to produce rocket thrust. In certain implementations, the energy contained in the rocket exhaust may be produced primarily from the solar energy beam.

Aspects of the present disclosure combine both chemical and solar thermal functions into a single rocket engine. The rocket engine is configured to operate as a completely conventional chemical rocket or as a completely solar thermal rocket. Additional hybrid operation allows the rocket engine to simultaneously combine energy sources from both chemical and solar thermal sources. Embodiments that use solar energy and do not rely exclusively on combustion are especially useful for space mining applications because chemically inert substances may be easier to find or mine in space (e.g., from an asteroid or moon), and it can be convenient to reduce a need for energy or thrust created exclusively from oxidation and/or combustion.

A hybrid motor can provide a solar absorber for absorbing and transferring solar energy as well as a combustion area. Multiple propellants can be present in a single chamber and be forced from a nozzle to produce thrust. Pressure in a rocket can be achieved from heating inert gasses, and alternatively or simultaneously, from mixing and igniting non-inert gasses.

One advantage to a rocket engine configured for hybrid operation is that oxidizer fluids are generally composed of much heavier molecules than propulsion fluids. It can be desirable to use lighter propulsion molecules as they generally give better thrust performance in comparison to heavier propulsion molecules. An example light propulsion molecule is hydrogen gas. Chemical combustion of hydrogen gas may require the additional use of oxygen gas. For each two grams of hydrogen gas, about 16 grams of additional oxygen gas may be needed for complete combustion. Solar energy augmentation can enable maximum usage of the available hydrogen propulsion fuel in the presence of an amount of oxygen insufficient for complete combustion or in the presence of no oxygen at all. Hybrid operation also enables the rocket motor to smoothly transition from solar thermal propulsion to chemical propulsion and vice versa.

Figure 10:
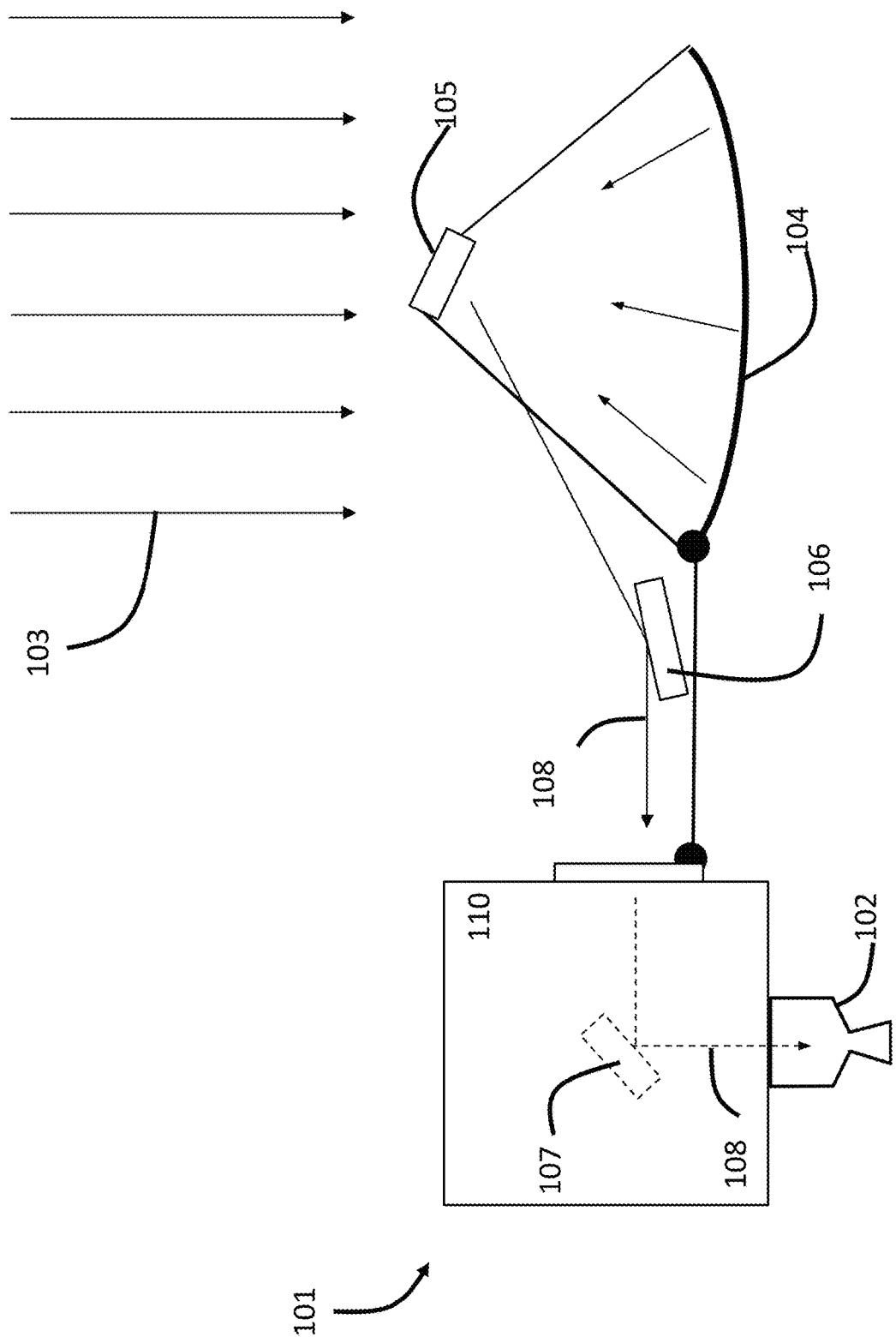
FIG. 10 illustrates a solar thermal rocket in accordance with aspects of this disclosure.

FIG. 10 illustrates a solar thermal rocket in accordance with aspects of this disclosure. Referring to FIG. 10, the main body 110 of a solar thermal spacecraft 101, also referred to as the bus 110, can contain the fuel, electrical components, and communication equipment for a mission. The spacecraft 101 includes one or more rocket propulsion systems 102, a collection mirror 104, a series of mirrors and/or lenses 105, 106, 107. The one or more rocket propulsion systems 102 are configured to provide maneuvering capability. The collection mirror 104 is configured to collect and concentrate incoming solar energy 103 from the distant sun. The series of mirrors and/or lenses 105, 106, and 107 are configured to further concentrate the solar energy into a powerful energy beam 108 and direct it into the rocket motor 102 to provide propulsion energy.

Figure 11:
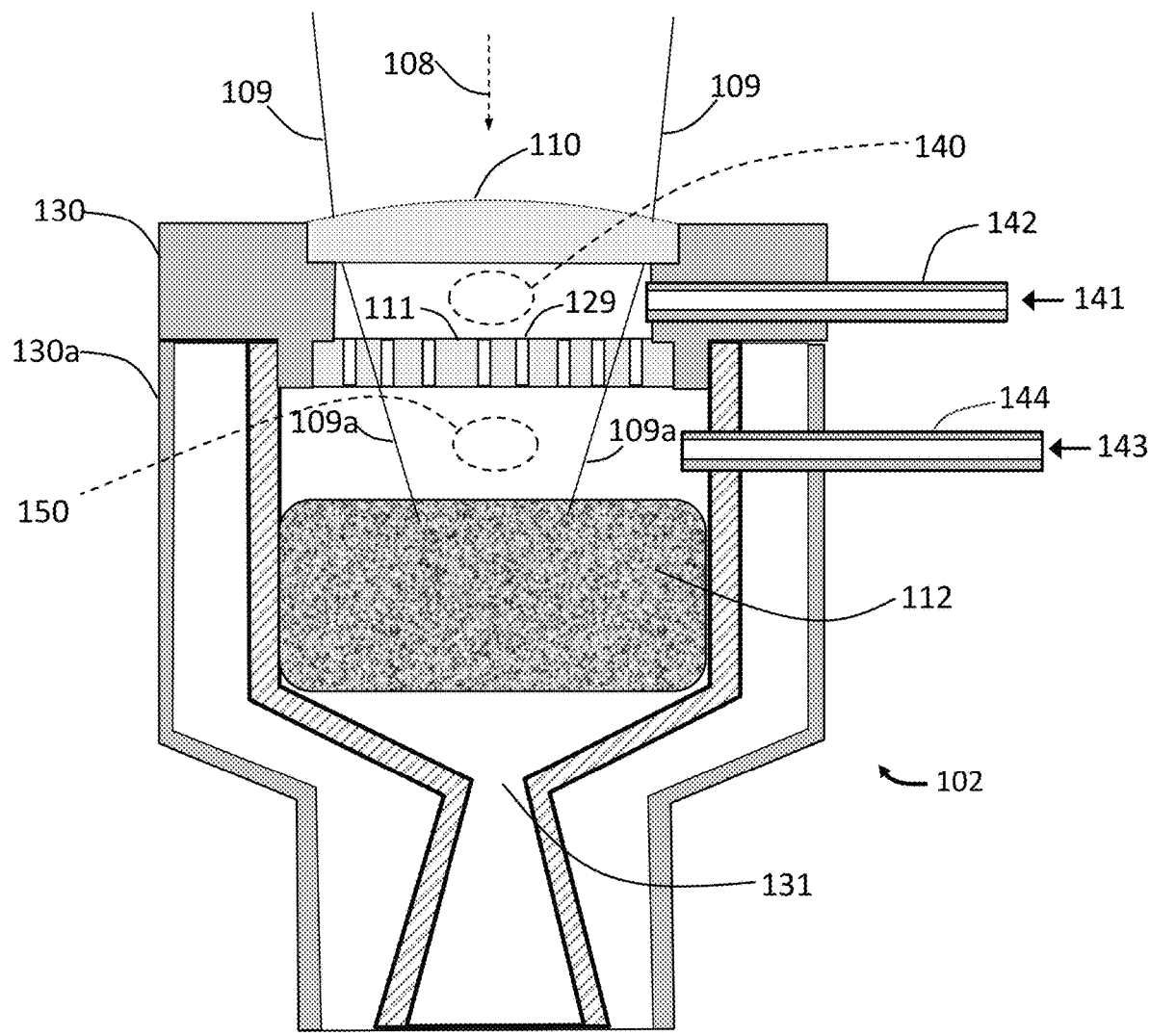
FIG. 11 illustrates the details of a solar thermal rocket propulsion system in accordance with aspects of this disclosure.

FIG. 11 illustrates the details of a solar thermal rocket propulsion system in accordance with aspects of this disclosure. The rocket propulsion system 102 includes two transparent windows 110 and 111, a rocket propulsion system body 130 and 130a, a converging-diverging rocket nozzle 131, a solar absorber 112, a first injector tube 142, and a second injector tube 144. The energy beam 108, represented in FIG. 11 within boundary rays 109, enters the rocket propulsion system 102 through the two transparent windows 110 and 111. The first window 110 forms a pressure seal against components of the rocket propulsion system body 130 and 130a. The window 110 may have flat or curved surfaces forming a focusing lens (represented in this figure with a convex surface on the upper side, but not limited to this shape or orientation). To reduce undesired optical reflections, one or both major surfaces of the first window 110 may be coated with anti-reflection coatings.

The rocket propulsion system 102 is configured to heat a pressurized propellant gas to a high temperature and then expel the gas through the converging-diverging rocket nozzle 131 in order to produce useful rocket thrust. Most suitable propellant gasses are substantially transparent to solar energy. Thus, such gases will not efficiently absorb the wavelengths present in solar light directly.

The first window 110 focuses the energy beam 108 into a converging energy beam represented within boundary rays 109a. The converging energy beam 108 passes through the second transparent window 111 and then into the solar absorber 112. The focusing effect can be achieved by the combination of both the first and second transparent windows 110 and 111. Thus they can act as a lens system, in addition to their other functions. Moreover, thin films or other coatings may be used to affect how energy propagates through these two windows. For example, a space between the windows 110 and 111 can be selected or adjusted to account for potential reflection and/or refraction. The index of refraction may be different for any combination of material forming one or both windows, and this may in turn be different from any such index for a gas material within the plenum 140. Accordingly, the system 102 can use these windows and optical/electromagnetic principles to help focus external energy on the system's internal heater exchanger 112.

The solid bulk material of solar absorber 112 can be designed to be an efficient absorber of solar energy, e.g., provided by the energy beam 108. The incoming energy beam 108 heats the solar absorber 112 to a high temperature, typically on the order of 2000 degrees Celsius. In some embodiments, the solar absorber 112 is porous, to allow the flow of propellant gasses through the solar absorber 112. The solar absorber 112 can contain a network of pores and internal passages that, in the aggregate, present a large internal surface area which, by heat conduction from surfaces to flowing fluid, efficiently transfers heat energy from the bulk material of the solar absorber to the propellant gas. Thus, mediated flow of propellant through the solar absorber can be achieved at the same time that heat conduction occurs.

Highly concentrated solar energy in a small volume can produce temperatures far higher than the melting point of all known solid materials. Therefore, the focusing properties of first window 110 (or the window system of both that and window 111) may be chosen to limit the concentration of solar energy to temperatures within the safe operating limits of the solar absorber 112 and the surrounding structures 130a. In some embodiments, a separation space can be adjusted to achieve an additive or canceling effect— e.g., to transmit or restrict transmission of solar energy. For example, a sensor can track an internal temperature. If a tracked temperature exceeds a threshold, the sensor can trigger an adjustment. For example, a motor can adjust a space or angle between windows 110 and 111 to effectively change the focus of the beam 108, direct some portion of solar energy differently (e.g., away from the heater exchanger 112), achieve a reflection state for one or more wavelengths, etc.

The second window 111 may be spaced away from first window 110 by a predetermined or adjustable distance. In some implementations, the distance between the first and second windows 110 and 111 may be on the order of 1 centimeter, however, in other implementations, the distance may be greater or less than 1 centimeter. In some embodiments, the distance may be 20 centimeters. In certain embodiments, the volume contained generally between the two windows 110 and 111 forms a plenum 140 configured to hold a pressurized propulsion gas. A first propulsion gas 141 can be injected into the plenum 140 through a first injector tube 142. Once in the plenum 140, the propulsion gas 141 can continue to flow out via any available path (in some embodiments, influenced by fluid pressures and/or absorbed solar energy). In some embodiments, the second window 111 can include a plurality of small through-holes 129, which permit the first propulsion gas 141 to uniformly flow through window 111 into the volume of thrust chamber 150 in a two-dimensional pattern of linear jets.

Similarly, a second propulsion gas 143 can be injected through a second injector tube 144 into the thrust chamber 150. Both of the gases 141 and 143 can be driven by their supply pressures to flow through the solar absorber 112 and into the rocket nozzle 131. The temperature of the gases 141 and 143 and their thermal energy content (enthalpy) can be greatly increased by passage through the solar absorber 112 (e.g., which provides heat from the energy beam 108 to the gases 141 and 143). The rocket nozzle 131 efficiently converts the random thermal motion and the relatively slow flow-velocity of hot gas molecules into linear motion in a high-speed exhaust plume, thereby producing rocket thrust.

The use of the two windows 110 and 111 and two injection gasses 141 and 143 provides a number of advantages over other thruster systems. One advantage is that many different types of gasses can be used to produce thrust in the rocket propulsion system 102. Examples of gases that can be used in the rocket propulsion system 102 include but are not limited to: $H_2$, $H_2O$, HF, Ar, $Cl_2$, Br, $CO_2$, $N_2$, $NH_3$, $CH_4$, mixtures of these gases, and a variety of volatile hydrocarbon molecules.

In one highly useful approach, a material (e.g., gas) flowing through the upstream injector tube 142 is cleaner than material flowing through the downstream injector tube 144. The cleaner gas can be selected to avoid or reduce deposits on optical surfaces (such as the surfaces of the windows 110 and 111). Thus, the cleaner material can serve to shield these surfaces from contact with less clean material entering downstream. Injecting a clean or protecting substance upstream can serve to protect upstream optics, thereby enabling use of less clean substances downstream while still preserving optical function. This occurs as cleaner fluid flows into plenum 140 via through-holes 129. This cleaner substance and flow under pressure prevents backflow from less clean substances coming in through the injector tube 144. The cleaner material can form a protective zone even downstream from and near the surface of the window 111, as it flows down and out of through-holes 129. The structure and flow sequence it establishes can thus provide a cleaning or preserving effect for optical features when propellant materials are selected properly. Thus, the upstream injection gas 141 can be a cleaning (or non-coking) gas such as one or more of water vapor, $H_2$, HF, and $CL_2$, for example. Gasses formed from atoms with low mass generally allow higher velocities. The downstream injection gas 144, by contrast, can be less clean and can include materials that may tend to form coke deposits. This can be useful because a supply of cleaner materials may be limited, so use of alternative propellants—even coking materials—can extend a range of a vehicle. The less clean propellant materials can include those that are no inherently less clean but are subject to decomposition and creation of carbon-like deposits when exposed to solar energy.

Fluid flow through a structure such as that shown in FIG. 11 can be unidirectional. For example, both the gases 141 and 143 can be pumped in the direction shown by the arrows into the plena 140 and 150. This can in turn bias flow downward via through-holes 129 and downward through the porous solar absorber 112. Mechanical or other pumping approaches can urge fluid flow in this consistent direction. Because propellant materials do not generally heat directly from solar energy, most heat exchange occurs through conduction rather than radiation. Fluid is heated from physical contact during prolonged flow through tortuous passages in the solar absorber 112. Downstream flow can be achieved through balancing the total cross-sectional area of the through-holes 129 versus the total cross-sectional area of the neck of the nozzle 131. Moreover, once flow direction is established and fluid exits the nozzle 131, mechanical pumping may be supported by flow continuity as gas flowing downward and out of the nozzle 131 achieves choked or supersonic flow status. In this situation the flow rate can depend only on upstream pressure, as sound energy does not travel upstream. Thus, the solar absorber 112 and funnel shape of the nozzle and surrounding walls can convert thermal into kinetic energy.

Figure 12:
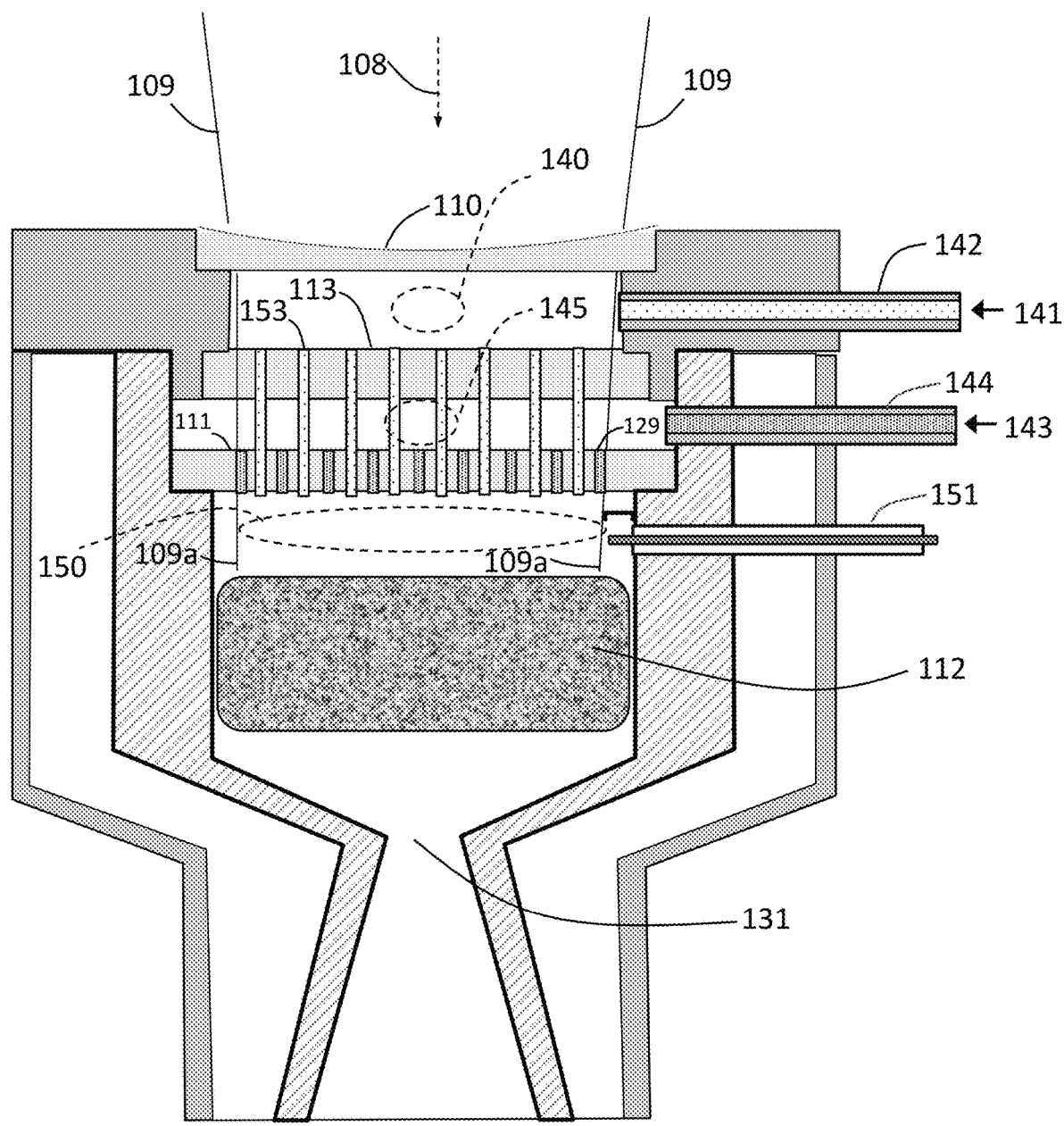
FIG. 12 illustrates details of a hybrid solar-thermal and chemical rocket propulsion system in accordance with aspects of this disclosure.

FIG. 12 illustrates details of a hybrid solar-thermal and chemical rocket propulsion system in accordance with aspects of this disclosure. Compared to the solar thermal engine shown in FIG. 11, this rocket propulsion system further includes a third, intermediate window 113, interposed between the first and second windows 110 and 111. The rocket propulsion system also includes an electrical igniter 151. This or additional igniters can be positioned differently, such as closer to the nozzle 131 or on the other side of a solar absorber 112, for example (see FIG. 13).

The volume contained between the two windows 110 and 113 forms a first plenum 140 configured to receive a first pressurized propulsion gas 141. The gas 141 flows into the plenum 140 through the injector tube 142, then out through bypass tubes in fluid communication with the chamber 150. The volume between windows 113 and 111 forms a second plenum volume 145. A second propulsion gas 143 can flow through injector tube 144 into the plenum volume 145. The second window 111 can include a plurality of small through-holes 129 which permit the propulsion gas 143 to uniformly flow out of plenum volume 145 and out through the second window 111 into the volume of the thrust chamber 150 in a two-dimensional pattern of linear jets, which may have similar benefits and function to that described above with respect to FIG. 11.

In some embodiments, the configuration of FIG. 12 is designed to accept two relatively clean fluids through both the injector tubes 142 and 144. In some embodiments, additional gas injector tubes can be added. For example, to avoid or reduce coking or other build-up on optical surfaces (such as window surfaces in the plenum 145), clean gas can be injected through both the tubes 142 and 144, and another tube can be added with access into the plenum 150, designed to introduce less clean material (e.g., which may result from space mining operations). With such an embodiment, the principles illustrated in FIGS. 11 and 12 can be combined.

For chemical combustion rocket engines, it is desirable to keep fuel and oxidizer gases separated until they can chemically react in a chamber designed to contain such a high energy interaction, illustrated here as combustion chamber 150. Therefore, the third window 113 can include a plurality of bypass tubes 153. The bypass tubes 153 allow the first propulsion gas 141 to pass through the third window 113, bypass the second plenum volume 145, and pass through the second window 111 before mixing with the second propulsion gas 143 in the combustion chamber 150. For example, the second window 111 can also include an array of bypass openings (in addition to the through-holes 129), which allow passage of the bypass tubes 153 without substantial gas leakage around the outer surfaces of the bypass tubes 153. Accordingly, two separate materials (e.g., propellant fluids) can be injected and remain separate until ultimately mixing in the combustion chamber 150. This same configuration can be used even if combustion is not the goal and materials should be kept separate for other reasons.

The electrical igniter 151 can be used to initiate combustion between the first and second propulsion gases in the combustion chamber 150.

The combustion chamber 150 can contain or be bounded on one side by a solar absorber 112, which may be heated by an incoming solar energy beam 109a, by heat derived from the chemical combustion of the gases 141 and 143, or by a simultaneous combination of both. It can be helpful to have a solar absorber that spans the width of the combustion chamber 150 and has a consistent depth, so that all gas flowing down toward the nozzle 131 encounters approximately the same amount of heating substrate during this process. This can avoid temperature discontinuities. Uniform gas heating can help achieve predictable and stable flow for rocket propulsion. Alternative geometries are also possible. For example, a solar absorber may occupy but not fully traverse a combustion chamber 150. A solar absorber material can be formed in a torus, a perforated disk, or various other shapes. It can form some or all of an internal wall of a combustion chamber. Such alternative geometries may not heat downward-flowing gas (from conduction) as uniformly as the generally solid disk-shaped solar absorber 112. However, they may allow combustion to occur more continuously (above, below, and through openings in the structure), and thereby achieve a similar heating result.

Heat is transferred by conduction between the solar absorber 112 and the propulsion gases and any gaseous chemical combustion products as the gases flow through the porous solar absorber 112. In preferred embodiments, the solar absorber is hotter than surrounding gases and therefore transfers heat to them. The solar absorber can achieve this state of higher thermal energy from absorbing solar radiation. In a hybrid system, it can also absorb energy from chemical reactions (e.g., combustion). The structure of FIG. 12, for example, can facilitate combustion immediately above the solar absorber 112 in plenum 150 using igniter 112 and mixed propellants that also act as combustibles. By absorbing energy from two different sources (e.g., alternatively or simultaneously), but consistently transferring that heat by conduction to whatever gas, material, or mixture is flowing through its pores, the solar absorber 112 can facilitate hybrid function. The arrangement illustrated in FIG. 12 tends to facilitate combustion in the plenum 150. However, interposing the solar absorber 112 tends to prevent such combustion from also simultaneously occurring below the solar absorber 112 near the nozzle 131. This is because when gases undergoing combustion encounter the solar absorber 112, if it is cooler it will tend to absorb energy from these combusting materials, reduce their energy levels, and remove them from the combusting state. However, this can have the benefit of further heating the solar absorber 112, such that as these formerly combusting gases flow through, then can regain at least some of the combustion energy. If combustion occurs downstream from the solar absorber 112, but not upstream (see FIG. 13), a more monotonic temperature increase can occur as gases attain successively higher energy levels before being exhausted through the nozzle 131.

Larger volume rockets are generally more effective than smaller volume rockets because volume scales as the diameter (or radius) to the third power, whereas surface area scales as the diameter (or radius) to the second power. Thus, larger rockets have a higher volume to surface area ratio, which tends to reduce the rate at which energy escapes through the walls, as compared to rockets of similar shape but smaller volumes. Accordingly, although it is possible to create a hybrid rocket comprising multiple distinct rocket engines, each designed to function with its own propellant, the present approach can be more thermally efficient. A large version of the described thermal rocket can also be more efficient or effective by sharing components, including the combustion chamber itself. Having a larger rocket designed to accept multiple propellants can thus have advantages over alternatives, especially if they involve multiple smaller rockets.

Below the solar absorber (in FIG. 12), the rocket nozzle 131 efficiently converts the random thermal motion and the relatively slow flow-velocity of hot gas molecules into linear motion in a high-speed exhaust plume, thereby producing rocket thrust.

Hybrid operation allows the rocket engine to simultaneously combine energy from both chemical and solar thermal sources for the useful production of rocket thrust. The hybrid solar-thermal and chemical rocket propulsion system can be used to transition from completely chemical combustion heating to combined solar-thermal plus chemical combustion to completely solar thermal heating. In preferred embodiments, such a transition can occur smoothly, without significantly interrupting thrust.

Expelling Unburned Chemical Components from a Hybrid Rocket

A multi-fuel rocket propulsion motor (also referred to as a "hybrid solar-thermal and chemical rocket propulsion system") typically includes a first capability for heating a supply of pressurized water vapor to a high temperature with a concentrated solar energy beam. The heated and pressurized water vapor can then be expelled through a converging-diverging rocket nozzle to produce rocket thrust. Using this first capability, the rocket motor can function as a solar-thermal rocket motor.

Alternately or simultaneously in a second mode of operation, the rocket propulsion motor can include a second capability for supplying a conventional rocket fuel and separate oxidizer to the motor. The second capability can ignite the fuel and oxidizer to produce an exothermic chemical combustion. The combustion products provide a pressurized and high temperature gas which is then expelled through the rocket nozzle to produce rocket thrust. Using the second capability, the motor can function as a conventional chemical rocket. When both capabilities are employed simultaneously, the thrust contributions from both capabilities are generally additive to the final thrust performance of the rocket motor.

When chemical rockets exhaust their fuel and oxidizer supplies, it is typically the case that not all of the chemicals have been consumed. For example, it is commonly the case that either the oxidizer is consumed before all of the fuel has been combusted, or vice-versa. The leftover unburned component provides no useful thrust and constitutes a useless dead weight to the spacecraft. The unburned component may also slowly leak through the rocket nozzle with insufficient energy to break free from the host spacecraft. The leaking component may contaminate sensitive spacecraft surfaces, such as optical elements, or it may chemically corrode and degrade other surfaces, such as solar energy panels.

It is desirable to forcefully and completely expel unburned chemical components to address the above-identified problems. To that end, aspects of the present disclosure relate to a rocket motor that can be operated as a solar thermal motor. A pressurized high temperature water vapor can be used to entrain and expel residual chemical components at high speed through the nozzle. Furthermore, the unburned components can add high speed mass to the rocket exhaust in addition to the water vapor mass, thereby somewhat increasing the rocket thrust over the case of water-only exhaust.

In other circumstances, the solar energy collection system may become temporarily blocked from receiving solar energy from the sun. Blockage may be due to shadowing or eclipse of the sun by intervening structures or heavenly bodies. Temporary blockage may also be unavoidable due to spacecraft maneuvers that may be required in order to capture or release useful spacecraft payloads. During times of solar energy blockage, it may be desirable to operate a combustion (e.g., multi-fuel) rocket motor similar to a traditional chemical rocket.

In a multi-fuel rocket motor when operated as a chemical rocket, various desirable propellants or fuels, for example hydrogen, propane, and/or alcohol, can have substantially different vaporization temperatures. Operation of the rocket motor within a desirable range of temperatures for a given propellant can be achieved by heating or cooling the motor body to the desired temperature range specific to each propellant.

Figure 13:
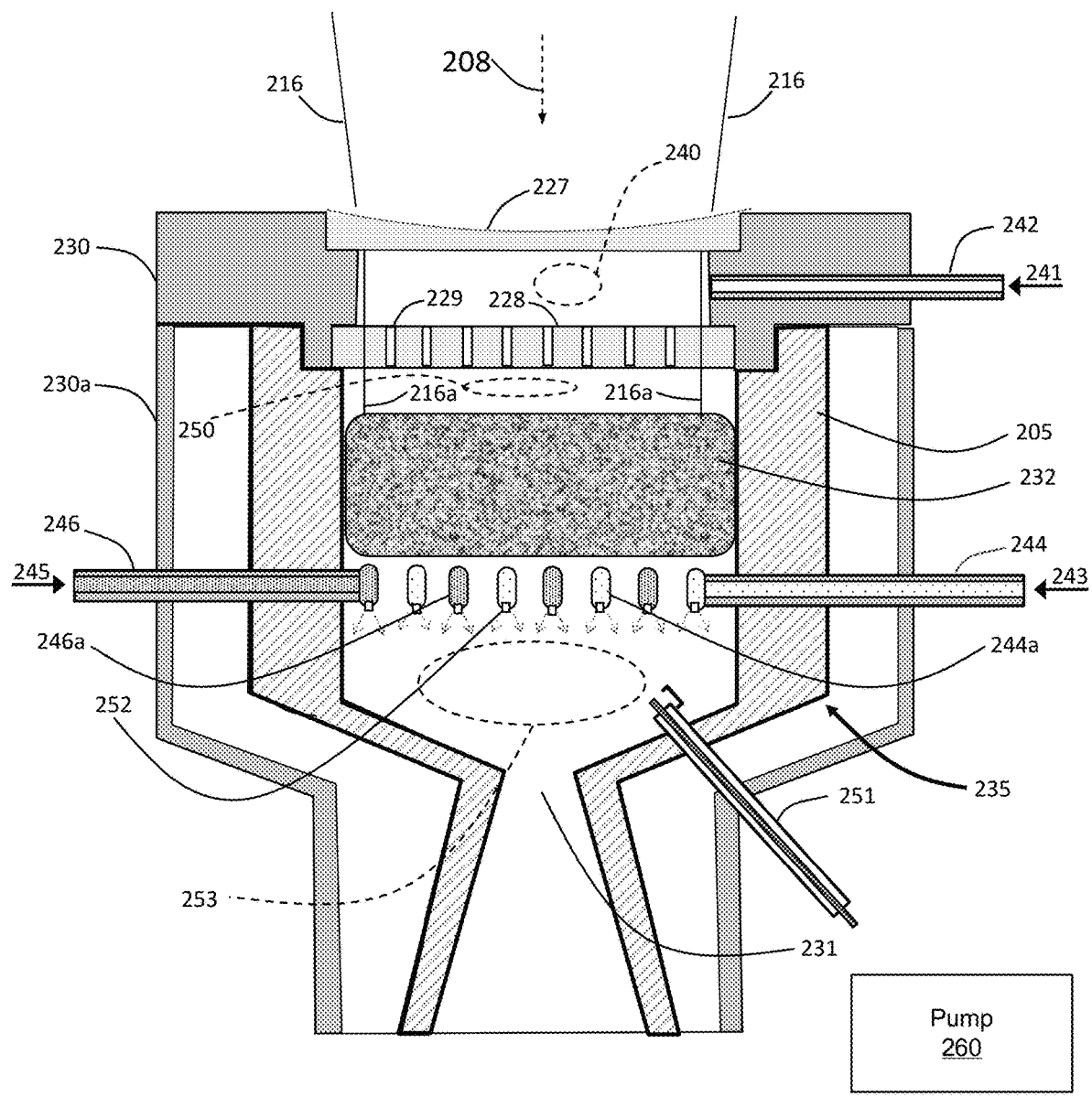
FIG. 13 illustrates an embodiment of a multi-fuel rocket propulsion motor in accordance with aspects of this disclosure.

FIG. 13 illustrates an embodiment of a multi-fuel rocket propulsion motor in accordance with aspects of this disclosure. Referring to FIG. 13, the multi-fuel rocket propulsion motor includes a launch rocket 205, transparent windows 227 and 228, a rocket propulsion system body 230 including an outer shell 230a, a nozzle 231, a solar absorber 232, a motor body 235, injector tubes 242, 244, and 246, a thrust chamber 250, an igniter 251, small injection orifices 252, and combustion region 253. The injector tubes 244 and 246 can respectively be formed into spiral hollow tubes 244a and 246a (see also FIG. 14).

Referring to FIG. 13, when operating as a solar thermal rocket, a concentrated solar energy beam 208 (shown with boundary lines 216) can enter the rocket motor through the first window 227, which may have flat or curved surfaces to support or allow for focusing (such as through a lens or series of lenses). The first window 227 is configured to focus and converge the energy beam 208 into a focused converging energy beam, represented with boundary rays 216a in the figure. The focused beam continues through the second window 228 and subsequently impinges on the bulk of the solar absorber 232, which absorbs its energy. In some cases, the solar absorber 232 may be heated to a relatively high temperature such as 2000 degrees C. This heating effect can occur partially or wholly through solar energy absorption. Such heating can also (or alternatively) occur at least in part by absorbing energy from adjacent combustion, as explained further below.

The injector tube 242 injects a propellant (e.g., pressurized gaseous propulsion fluid 241), such as water vapor, into a plenum volume 240 formed between the between the two windows 227 and 228. The second window 228 includes a plurality of through-holes 229 which direct the propulsion fluid 241 to substantially uniformly flow into and through plenum region 250 and then into the solar absorber 232. The propulsion fluid 241 is heated (through thermal conduction) to nearly the temperature of the solar absorber 232 as the propulsion fluid 241 passes through multiple small channels within the solar absorber 232.

In the embodiment of FIG. 13, the high temperature pressurized propulsion fluid 241 next passes between injector tubes 244 and 246 into the combustion region 253. The high temperature propulsion fluid 241 is then ejected through rocket nozzle 231 at high speed to produce rocket thrust.

When operating as a chemical rocket, the injector tube 244 can inject vaporized rocket propellant or fuel 243 into the motor. For effective combustion, uniform distribution and mixing with other combustion materials is desirable. Accordingly, in FIG. 13, the fuel 243 passes through the spiral hollow tube 244a (see FIG. 14 for a view showing the spiral) and is injected into the pressure chamber combustion region 253 through multiple small injection orifices 252 formed in the spiral tube 244a. The spiral tube 244a can distribute the fuel vapor 243 within the combustion region 253 in a widely dispersed manner. Other distributor shapes are also possible, such as a grid-shaped manifold. More tubes and holes can lead to greater uniformity if they are widely distributed. In a similar manner, the injector tube 246 and a spiral hollow tube 246a are configured to inject a vaporized oxidizer 45 into the motor. The spiral hollow tube 246a also contains multiple injection orifices 252 for wide dispersion tending to uniformity. By coordinating (e.g., interleaving) the shapes of the two (e.g., spiral) tubes 244a and 246a, the oxidizer vapor is interspersed and substantially uniformly mixed with the fuel vapor in in the combustion region 253. The igniter 251 can produce an electric spark discharge to ignite the mixture of vapors in the combustion region 253. A vigorous combustion will continue without further electric spark discharge from the igniter 251 as long as a continuous mixture of fuel and oxidizer is supplied. The hot combustion gasses are expelled through the nozzle 231 to provide rocket thrust.

It can be desirable to establish a continuously increasing temperature gradient in a hybrid rocket as gas approaches a rocket nozzle such as the nozzle 231 of FIG. 13. Thus, propellant gas can be initially heated to a certain extent even before arriving through tubes 241 into plena 240 or 250. The solar absorber 232 can further heat the gas, and combustion in the region 253 can continue to heat the gas even more, both by conduction (heating the bottom end of the solar absorber 232) and then directly as gas flows down toward the nozzle 231. Thus, gas can achieve its peak energy just before being expelled from the nozzle. This principle of successive heating can be further extended upstream from the illustrated structure. For example, water vapor, or steam can be used as the propellant gas 241. Steam can hold more energy (e.g., become super-heated), if it is drawn away from a water surface. Accordingly, it is desirable for the gas 241 to be dry steam. To provide dry steam, one or more further heaters can be arranged upstream of the tube 241. One such heater can use solar energy under the same principles described here. Thus, an upstream chamber can contain water in some form. One or more window lenses can focus solar energy on that water to create steam, which can then be urged to flow toward the structure of FIG. 13 (e.g., through a tube 242). This steam can then become super-heated using the structure of FIG. 13, far from any water surface in the separate chamber. Such successive heating chambers and windows can be established with successive lenses and windows that may be aligned with each other, such as those illustrated in FIG. 13. However, in contrast to the fluid connections formed with through-holes 229, an upstream chamber can be fluidically isolated from those shown here, except for access through the peripheral tube 241. A pumping motor, motors, or pump 260 creating gas pressure to drive flow through tubes 241, 243, and/or 245 can also use energy provided through solar means (e.g., photovoltaic energy), combustion, and/or batteries.

Figure 14:
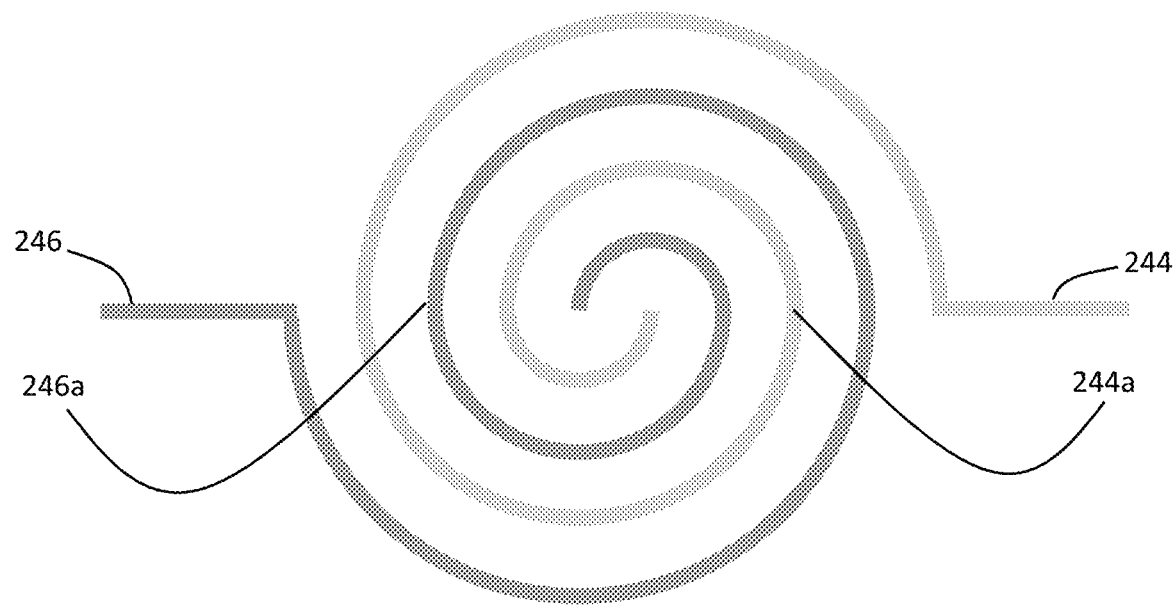
FIG. 14 illustrates a plan view of the interleaved spiral tubes of FIG. 13.

FIG. 14 illustrates a plan view of the interleaved spiral tubes 244a and 246a of FIG. 13. In this representation, the spiral patterns of the spiral tubes 244a and 246a help inject both fuel and oxidizer into a relatively uniform pattern across the area of the combustion region 253. Open space between the spirals 244a and 246a allows the propulsion fluid 241 to also substantially uniformly fill the combustion region 253. Thus, the multi-fuel solar-thermal rocket motor can perform efficiently.

Figure 15:
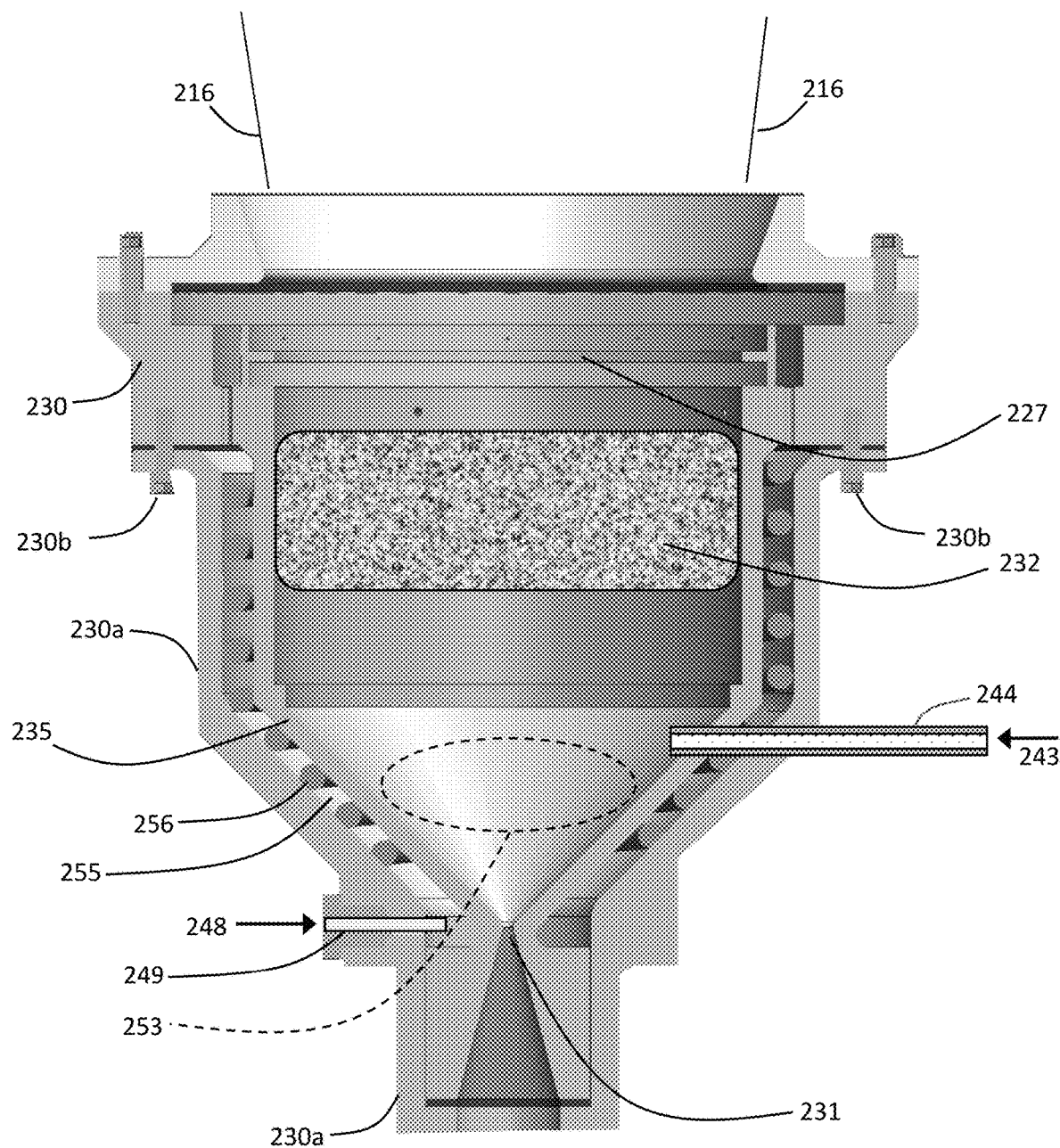
FIG. 15 illustrates a cross section through a multi-fuel rocket motor in accordance with aspects of this disclosure.

Referring to FIG. 15, it may be desirable to adjust temperature of a multi-fuel or multi-propellant rocket motor for optimum or increased thrust efficiency when using a particular propellant or fuel. Various desirable fuels, for example hydrogen, propane, and/or alcohol, can have substantially different vaporization temperatures. The rocket motor can heat or cool the motor body 235 to within a desirable range of temperatures specific to each fuel to achieve substantially optimal performance. It is desirable to have a common or universal motor design which can be quickly modified (e.g., automatically or at a fabrication or maintenance facility) to accommodate the temperature requirements of various propellants/fuels.

FIG. 15 represents a cross section through a multi-fuel rocket motor in accordance with aspects of this disclosure. In this figure, many details, such as the fuel injector geometry, have been omitted. The rocket motor may include all or many of the same components as the multi-fuel rocket propulsion motor of FIG. 9, 11, 12, 13, or 16, for example.

The motor body 235 can be surrounded by a shell 230a. The shell 230a can be rigid and substantially uniformly spaced away from the body 235 by a spiral separator coil 256, shown in cross-section. An injector tube 249 can inject a cooling fluid 248 into the space 255 between the motor body 235 and the outer shell 230a. The cross section of the separator coil 256 is illustrated to be round, but other shapes such as triangular or trapezoidal may be used for manufacturing convenience or to adjust the cooling effect, for example. The cooling fluid 248 can flow in a spiral passage from one end of the motor body 235 to the other, the passage defined by the space between turns of the separator coil 256. Cooling passages of other shapes may be defined by separator coils 256 of shapes other than a simple spiral. Alternatively, a hollow cooling tube can be embedded in the sidewall of a rocket with similar effect, allowing fluid to flow there-through and cool surrounding structure through thermal conduction.

For simplicity in this figure, an exit port for the cooling fluid 248 is not shown but can be located near the end of the spiral separator coil 256 opposite from the injection point 249. The number of turns of the separator coil 256 and the pitch and cross section geometry can be chosen or adjusted to provide the desired amount of cooling for a specific fuel vaporization temperature.

In many cases, the cooling fluid 248 injected at port 249 is substantially identical to the gaseous fuel for the rocket motor or another propellant. In these cases, the exit port for the cooling fluid 248 (not shown in FIG. 15) may be directly connected via tubing to the fuel injector port 244 or the tube 242. The gaseous fuel at or within a predefined range of the fuel's optimal temperature is then mixed with the oxidizer in the combustion region 253. Thus, in some embodiments, the cooling fluid 248 can also perform the function of a propellant gas. In another example, an outlet for this fluid can also form an inlet from a tube such as the tube 242, and the gas 241 can be the fluid 248, after heating. Additional disclosure on this multi-use gas concept is found, for example, in FIGS. 10-13 of U.S. Patent Publication No. 2021/0404419 and the related description The entire disclosure of that publication (including its priority application, U.S. Provisional Patent Application No. 63/016,186 and its appendices) is hereby incorporated into this disclosure for all that it contains, for all purposes.

The shell 230a can be attached to the upper motor body 230 by a circumferential attachment fixture, shown in this embodiment as a series of bolts 230b. Other attachment mechanisms, such as rings and clamps, may also be used.

With the shell 230a detached, the spiral separator coil 256 may be removed and replaced with a coil of a different pitch and cross section. To configure the rocket motor for a specific chemical fuel, a spiral coil of appropriate pitch can be installed and the shell 230a reattached. By this method, a standardized rocket motor design may be quickly adapted for use with a wide variety of propellant/fuel types. Other dynamic adjustments for similar cooling coil or manifold structures can be performed remotely and/or automatically, as further described in Appendix A as noted above.

Solar Absorber

Figure 16:
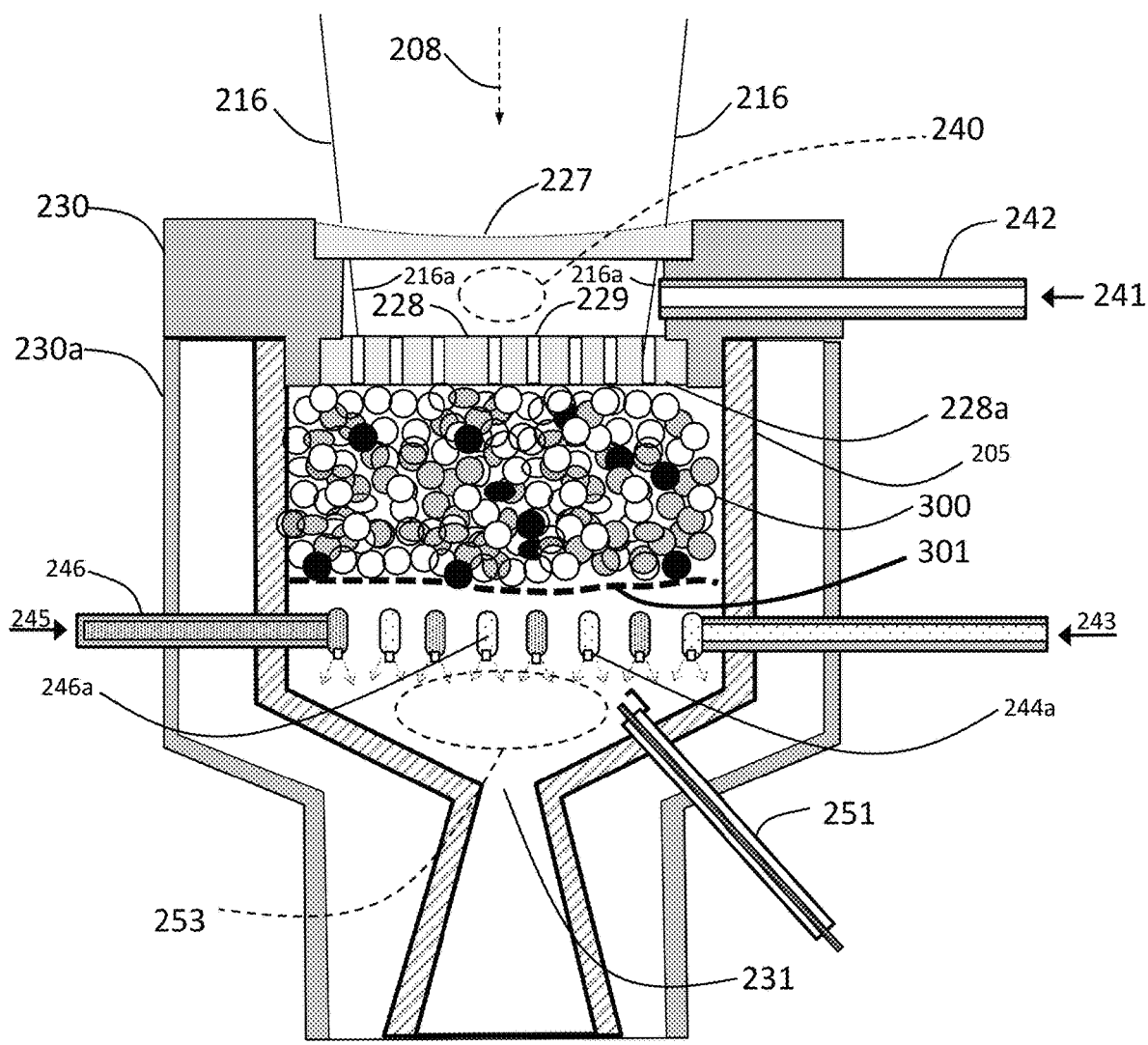
FIG. 16 illustrates a cross section through a rocket motor having an agglomeration of solids configured to absorb solar energy.

As noted above, a propulsion system can include an energy absorber that takes in energy from one or more external radiative sources. This can be referred to for convenience as a solar absorber, since the sun provides such an energy source. In some embodiments, a rocket propulsions system may contain a solar absorber that includes a conglomerate of material or materials. Sintering can be useful to form an energy absorbing, but liquid conducting mass, because it typically results in a somewhat porous solid. But a collection of particles need not be fused to achieve the function described here. Just as beads or particles can be packed into a liquid chromatography column (allowing fluid to flow between them), an agglomeration can be held together, e.g., with an external envelope or within a chamber of a rocket motor, in this context as well. Such an agglomeration can comprise, for example, a compact assembly of dielectric beads, such as quartz or sapphire, and/or metal beads, for example molybdenum or tungsten. FIG. 16 illustrates a solar thermal rocket having a solar absorber formed of a compact assembly of various dielectric or metal beads 300 in accordance with aspects of this disclosure. Certain elements of the solar thermal rocket may be the same as or similar to the solar thermal rocket of FIG. 13 and may be represented with the same reference numerals.

Depending on the embodiment, the separate beads 300 may be of various shapes, colors, reflectivity, and optical transparencies. The mixture of beads 300 can be formulated (e.g., as a collective) to provide a desirable level of absorption of a concentrated solar energy beam (e.g., solar absorption above a predetermined threshold) throughout the bulk of the solar absorber. The sizes, positions, optical properties, and/or other characteristics of the mixture of beads 300 may be adjusted or designed to accommodate rocket propulsion systems of various sizes. For example, relatively larger propulsion systems may benefit from wider and/or deeper solar absorbers than smaller propulsion systems and, therefore, relatively longer solar absorption distances. Furthermore, the open spaces between beads 300 provide multiple channels for propulsion gases to flow through the solar absorber. The large surface area of many beads 300 in close contact with the flowing propulsion gases provides for the efficient transfer of heat energy from the solar absorber to the propulsion gasses. The principles of fluid flow through the packed materials of a liquid chromatography column can apply here, in the sense that specialized design and tuning can be achieved with different mixtures of solid beads or other substrate materials. The adsorption that occurs in liquid chromatography can be analogized to the energy transfer that occurs in this solar rocket context. For example, larger bead size can allow faster flow but less thermal energy transfer. Smaller bead size can reduce flow (because available space is reduced), while increasing thermal transfer (greater surface area for such thermal interaction). Bead size is highly variable, and different beads can be mixed together in differing proportions. Layers, gradients, or other bead patterns can be used in designing an agglomeration of beads for this purpose.

In some embodiments, a solar absorber may contain beads 300 that are coated with a catalytic material, for example iridium metal or carbon nanotubes. Certain monopropellant gases such as hydrazine ($N_2H_4$) may be chemically dissociated by contact with a catalyst into smaller component molecules ($N_2+2H_2$). Other similar monopropellant gases include monomethyl hydrazine and unsymmetrical dimethyl hydrazine. The dissociation process is highly exothermic thereby increasing the temperature of the propulsion gasses. The dissociation also produces molecules of smaller atomic weight. A solar absorber that produces higher temperatures and smaller atomic weight molecules is desirable to increase both the thrust of a rocket and the specific-impulse efficiency of rocket propulsion.

Referring to FIG. 16, the solar absorber may comprise a compact assembly of various materials (e.g., dielectric and/or metal beads 300). The beads 300 can be grouped or contained. In this illustration, they are contained laterally within thruster body 205 and longitudinally between the lower surface 228a of optical window 228 and a confining screen 301. During operation as a solar thermal thruster, a pressurized propellant gas 241 is introduced through injector tube 242 into plenum space 240. The propellant gas 241 then flows through a plurality of holes 229 in optical window 228. The plenum 240 serves to equalize the pressure and the flow rate of the propellant gas 241 at the entrance to each of the holes 229. When the pressurized propellant gas 241 exits the holes 229 at the window exit face 228a, the propellant gas 241 is distributed (e.g., in a uniform or predetermined pattern) across an entrance face of the assembly of beads 300.

A concentrated solar energy beam 208, indicated by boundary rays 216 and 216a, passes through windows 227 and 228, and into the front surface of the assembly of beads 300. The diameter and intensity distribution of the energy beam 208 can be selected, controlled, and/or chosen to coordinate with the distribution of propulsion gas 241 at the front surface of the assembly of beads 300. For example, arrival of gas 241 can be delayed until the beads 300 reach a sufficient temperature. As the solar energy beam 208 penetrates the assembly of beads 300, the solar energy beam 208 will encounter multiple reflecting, refracting, and absorbing surfaces. Energy may pass, through heat conduction, between beads that are not exposed directly to solar energy but are in collective contact ultimately with those that are. Over time, energy from the beam 208 is substantially (and, depending on net inflows and outflows and exposure time, potentially uniformly) distributed through or absorbed within the bulk of the assembly of beads 300. At the exit face of the assembly, beads 300 can be contained in place. For example, a screen 301 can be formed from refractory metal wire, such as tungsten. In some embodiments, the beads 300 may be contained in place by another structure that allows the propulsion gas 241 to pass through the containment structure, such as a window similar to optical window 228 having a plurality of holes 229 therein. The power absorbed from energy beam 208 heats the assembly of beads 300 throughout its bulk to a high temperature.

While the beads 300 are hot or being heated, the pressurized propellant gas 241 enters the assembly of beads 300 through the holes 229. Pressurization of the gas 241 from its source forces the gas 241 to spread throughout the solar absorber by traveling through the multiple small spaces between the beads 300. Close contact between the gas 241 and large surface area of the beads 300 transfers heat energy to the gas 241 by conduction (which may be supplemented convection and other heat transfer mechanisms). The gas 241 may be further heated and dissociated into smaller molecules by exothermic decomposition due to contact with catalytic coatings on at least some of the beads 300 in embodiments in which the beads 300 are coated with catalytic coating(s). The propulsion gas 241 exits the solar absorber at high temperature through screen 301 and flows into plenum or combustion chamber 253.

When operating as a chemical rocket or in hybrid operation as a solar-thermal and chemical rocket, additional propulsion gases 243 and 245 may be introduced into the combustion chamber 253 and ignited by the igniter 251. For example, a combination of pressurized solar-heated gases 241 and chemical-combustion heated gases 243, 245 can be expelled through the converging-diverging rocket nozzle 231 to produce useful rocket thrust.

Absorber Layering and Gradients

FIG. 16 illustrates, as described above, a mass or agglomeration of absorbing solids (e.g., a compact assembly of dielectric or metal beads). In some embodiments, the solids are not identical in size, material, shape, color, transmissivity, absorptivity, and/or other properties. This collection of solids can absorb energy from solar radiation, then transfer that energy into surrounding fluids, such as rocket propellant. Some solids can be partially absorbent and partially transparent, allowing at least some energy to reach underlying layers of additional solids. Even after absorption, energy can also be transferred to adjacent solids, such that a mass of solids in mutual contact can share heat energy. Beads can share energy through thermal contact, but this is often minimal for circular beads. Although FIG. 16 schematically depicts beads of different colors somewhat randomly distributed, the properties of such beads can be different in useful ways and they can be arranged strategically. If more transparent solids are used near a surface, for example, solar energy can pass through these solids to reach less transparent (and more highly absorbing) solids deeper in the agglomeration. Thus, some embodiments have layers of beads that can be depicted as lighter toward the top, gray in the middle, and dark or black toward the bottom of an agglomeration, in contrast to the non-layered illustration of a mixture of beads 300 in FIG. 16.

Solids can be selected for inclusion at different distances from incoming solar energy (after the energy is concentrated and/or transmitted through one or more windows, for example). More transparent solids may be good candidates for use near the surface of an agglomeration—especially a solar-facing surface. Solids that can share energy thermally, as well as optically, with other solids may be valuable in such a surface position. Less transparent, but more absorbent solids can have properties that better fit the role of receiving energy and transmitting that energy to propellant fluids. These solids may be better suited for deeper layers, through which solar rays need not pass further, and where the highest temperatures may be desired. Some "transitional solids" (those that transmit and absorb radiation in relatively equal measure, for example) may be well suited to fill a role somewhere in between these two. A series of successive and contacting layers can be constructed from these solids, where each fills a role that fits with its position within a rocket chamber. Thus, in some embodiments having a solar window at one end and a nozzle outlet at another, it can be useful to establish a transparency gradient using solids, the gradient running from most transparent closer to a solar window to least transparent closer to the nozzle outlet. Because transparency and absorbency are generally inversely related in such materials, a similar but generally inverse absorbency gradient can coexist, with least absorbing solids toward the solar window and most absorbing solids toward the nozzle outlet. In this manner, a collection of solids can be designed to heat up when receiving solar radiation. This can establish a relatively even heating effect through the depth layers of an agglomeration, despite some solids in the agglomeration being near or farther from a solar window. Alternatively, the arrangements described herein can result in a temperature gradient that increases with depth (or that would do so absent any cooling effects from ongoing fluid flow).

Such gradients can be arranged primarily to allow effective thermal patterns (e.g., gradients) in propellants that pass through the interstitial space between solids as they flow generally from near a solar window toward the nozzle outlet. Thus, with further reference to FIG. 16, the type, characteristics, and number density of refractory beads in a solar absorber may be configured to control the temperature profile of the solar absorber from top to bottom and radially from the wall of the thruster body 205 to the center of the absorber. For example, beads which only slightly absorb solar energy may be layered near the top surface of the absorber. More strongly absorbing beads may be placed deeper within the absorber. In this manner, the temperature of beads near entrance windows may be kept relatively lower to provide thermal protection for the solar transparent windows (including, for example, any relevant coatings) while propulsion gases deeper within the solar absorber (and/or closer to the nozzle through which propulsion fluid is expelled) will heat to a higher (e.g., a maximum or otherwise optimized) temperature.

The heating process that occurs as some gases pass through a fluid-transmissible (e.g., porous) absorber can greatly affect the fluid properties, resulting in a fluid having initial properties toward the entrance and different properties toward the exit. For example, when some propellant fluids (e.g., monopropellant gases) are subject to higher heat, they dissociate, separating into molecules of lower molecular weight. As explained in U.S. Pat. No. 3,064,418 (which is hereby incorporated by reference for all that it contains), such dissociation can increase specific impulse in a rocket engine.

It can often be desirable to preferentially add heat to the lighter molecules. Accordingly, establishing gradients in non-flowing solid materials as discussed above can also establish a gradient in properties of the fluids that flow in, around, and through those non-flowing solids. These properties include both heat (e.g., amount of energy in the fluid), and molecule size of the fluid. In some embodiments, the types of beads may be layered or otherwise arranged or configured to enhance chemical reactions (e.g., reduction of molecule size) at intermediate depth of the absorber, and to enhance heat transfer from the solids or beads to the resulting smaller fluid molecules in a subsequent (e.g., deeper) depth of the absorber. Thus, successive depths can be designed for first fluid heating, then fluid disassociation, then further fluid heating. Because fluids having lower molecular weight components often flow more rapidly, hotter solids at the deepest levels can be helpful to allow highly efficient heat to transfer to those molecules as they flow more quickly through the solids.

Heat interactions between an agglomeration of solids which may have different properties, subject to (1) incoming solar radiation at one end of the agglomeration; and (2) dynamic flow of compound fluid through interstices of the agglomeration, can be very complex. For example, the rate of heat absorption from the solids into the flowing propellant fluid often depends, in part, on the amount of heat energy already in the fluid. Accordingly, under some conditions, material, transparency, and absorption gradients such as those described herein can be necessary even to maintain or create a consistent or desired level of energy transfer over the length of a solar absorber. Absent such gradients, a heating effect may be limited to initial layers that absorb solar energy and block it from penetrating to lower layers of solids. Thus, propellant energy may level off or even decrease (if surrounding solids are cool enough to absorb, rather than effuse, energy from thermal contact) as the propellant flows down toward a nozzle outlet.

Although the gradients and thermal and chemical configurations are described above with reference to a single axis or dimension (e.g., flowing generally from a solar window toward an outlet nozzle from the rocket chamber), the same principles can be applied to rocket chambers having multiple axes. Rather than single-axis geometry, a rocket engine can have multi-axis geometry. For example, multiple solar windows can be arranged to receive multiple solar beams, and direct them all toward a central thermal mass, as propellant fluid flows generally away from those windows, through the thermal mass, and out a nozzle outlet. Such multiple inputs can be useful when more solar energy may be needed or available, or to reduce a need for additional reflectors or other solar energy guiding structures. Moreover, multiple thermal masses can be used. Multiple nozzle outlets can also be employed, but typically such outlets are associated each with their own rocket propellant chamber.

Based on the principles and configurations described above, a solar absorber can have a closely-positioned assembly of beads of various types layered and arranged to control the volume-absorption of solar energy. Such arrangements can provide a desired temperature profile within the absorber. Thus, a mixture of bead types can be designed to establish a desired solar absorption and temperature distribution within a solar absorber (which can also act as a solar collector and heat exchanger). Some distributions can be designed to keep solar windows cool and/or enhance chemical reactions.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description is not intended to be exhaustive or to limit the invention to the precise form disclosed above. While specific embodiments of, and examples are described above for illustrative purposes, various equivalent modifications are possible within the scope of the disclosed invention(s), as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings provided herein can be applied to other systems, not necessarily the system described above. The elements and acts of the various embodiments described above can be combined to provide further embodiments.

While certain embodiments have been described, these embodiments have been presented by way of example only, and are not intended to limit the scope of the disclosure.

Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A rocket propulsion system configured to provide rocket thrust, comprising:
   a wall generally enclosing a rocket chamber;
   a solar absorber material positioned within the rocket chamber;
   a rocket nozzle;
   a solar power collection system comprising a plurality of transparent windows including a first transparent window configured to allow one or more propulsive gases to pass therethrough and a second transparent window, each of the plurality of transparent windows formed of a solid transparent material, the solar power collection system configured to:
   collect solar energy from the sun,
   generate a solar energy beam by focusing the collected solar energy with at least the second transparent window,
   heat the solar absorber material with the solar energy beam to transfer heat to the one or more pressurized propulsive gases, and
   expel the heated pressurized propulsive gases through the rocket nozzle;
   a pressurized gas inlet configured to introduce the one or more propulsive gases into a first plenum chamber formed between the between the first and second transparent windows;
   a manifold configured to mix combustible materials; and
   an igniter configured to ignite combustion in the combustible materials;
   the wall of the rocket chamber generally forms a frusto-conical portion surrounding a propellant exit configured to allow the heated pressurized propulsive gases and byproducts from the combustion of the combustible materials to exit to the rocket nozzle.

2. The system of claim 1 wherein the one or more pressurized propulsive gases are configured to:
   react chemically to produce heat,
   receive heat from the solar absorber material, and/or
   exit the rocket nozzle to produce thrust.

3. The system of claim 2 wherein the rocket propulsion system further comprises:
   a body enclosing the solar absorber,
   wherein the second transparent window is configured to provide a pressure seal against the body and provide a controlled amount of focusing of the solar energy beam to the solar absorber.

4. The system of claim 3 wherein the plurality of transparent windows comprise:
   a third transparent window arranged within the body and spaced away from the first and second windows, wherein a second plenum chamber is formed between the first and third windows, and
   wherein the first plenum chamber is configured to receive a first propulsion gas injected therein, and the second plenum chamber is configured to receive a second propulsion gas injected therein.

5. The system of claim 4 wherein the first transparent window has an array of hollow tubes formed therein and configured to allow the first propulsion gas to flow out of the first plenum chamber passing through the first transparent window, passing through the second plenum chamber, and passing through the third transparent window, into the rocket chamber, and
   wherein the propulsive gas flowing through the array of hollow tubes produces a substantially turbulence-free protective gas barrier near an output surface of the third transparent window.

6. The system of claim 5 wherein the third transparent window includes:
   a first array of through-holes which allow passage of the hollow tubes without substantial gas leakage around the outer surfaces of the hollow tubes, and
   a second array of through-holes which allow passage of the second propulsive gas from the second plenum chamber through the third transparent window into the pressure chamber formed in the body and containing the solar absorber,
   wherein the propulsive gas flowing through the array of first and second arrays of through-holes produces a substantially turbulence-free protective gas barrier near an output surface of the third transparent window, where the propulsion chamber includes an electrical igniter to initiate chemical combustion in a mixture of chemically reactive propulsion gases.

7. The system of claim 2 where the propulsive gases include rocket propellant and oxidizer gases mixed with chemically inert gases.

8. The system of claim 2 where the solar energy and chemical combustion energy are employed simultaneously to heat propulsive gases.

9. The system of claim 2 where the rocket propulsion system is configured to transition from completely chemical combustion heating to combined solar-thermal plus chemical combustion to completely solar thermal heating without interrupting thrust.

10. The system of claim 2 where the solar absorber comprises an agglomeration of granules having intervening flow spaces.

11. The rocket propulsion system of claim 1, wherein the rocket chamber comprises:
    a pressurized rocket body, wherein the plurality of transparent windows are further configured to admit the solar energy beam into the pressurized rocket body, the solar absorber material located within the rocket body; and
    a combustion chamber configured to receive the heated pressurized propulsive gases;
    wherein the rocket propulsion system further comprises:
    a first injector tube configured to inject a gaseous combustible rocket propellant into the combustion chamber; and
    a second injector tube configured to inject a gaseous oxidizer into the combustion chamber
    wherein the rocket nozzle is configured to: expel any combustion gasses that may have resulted from igniting the gaseous combustible rocket propellant and the gaseous oxidizer in the combustion chamber to produce the rocket thrust.

12. The rocket propulsion system of claim 11, wherein the rocket propulsion system is configured to operate in:
    a solar mode by producing the rocket thrust by heating the pressurized propulsive gases using the concentrated solar energy without combusting the gaseous combustible rocket propellant and the gaseous oxidizer, a combustion mode by producing the rocket thrust via combustion of gaseous combustible rocket propellant and the gaseous oxidizer in exothermic chemical reactions, and a combined mode by producing the rocket thrust via a simultaneous combination of heating the pressurized gaseous propulsion fluid using the concentrated solar energy and combustion of gaseous combustible rocket propellant and the gaseous oxidizer in exothermic chemical reactions.

13. The rocket propulsion system of claim 11, wherein:
the first injector tube forms a first spiral tube in the combustion chamber,
the second injector tube forms a second spiral tube in the combustion chamber, and
the first and second spiral tubes are interleaved and thereby distribute and mix the gaseous combustible rocket propellant and the gaseous oxidizer in the combustion chamber, wherein the first and second spiral tubes are spaced apart to allow the heated pressurized gaseous propulsion fluid to pass between them toward a nozzle opening from the combustion chamber.

14. The rocket propulsion system of claim 11, further comprising a cooling structure in thermal contact with the rocket body, the cooling structure configured to direct cooling fluid to absorb heat energy through thermal conduction as the cooling fluid flows therethrough, wherein the rocket body containing the heated pressurized propulsive gases is surrounded by a rigid pressurized shell spaced apart from the rocket body with a plurality of separator coils formed between the rigid pressurized shell and the rocket body.

15. The rocket propulsion system of claim 14, further comprising:
a third injector tube configured to inject a gaseous fluid into passages defined by spaces between the separator coils, wherein the separator coils are configured to heat or cool the injected fluid and the rocket body.

16. The rocket propulsion system of claim 14, wherein:
the rigid pressurized shell is configured to be detached and reattached from the rocket body to allow the separator coils to be replaced, and
the separator coils are selected to provide cooling or heating based on a specific type of the gaseous rocket propellant.

17. A hybrid rocket motor configured for multiple energy modes within a single rocket chamber immediately upstream from a nozzle, the motor comprising:
a wall generally enclosing a hybrid rocket chamber;
a first window forming part of the wall, the window configured to allow radiation to enter while helping contain heat energy;
a second window spaced apart from the first window and configured to allow propellant to pass therethrough;
a thermal mass positioned to absorb radiation after entry through the window;
a pressurized gas inlet configured to introduce gas into the chamber such that the gas is heated by contact with the thermal mass;
a manifold configured to mix combustible materials; and
an igniter configured to ignite combustion in the combustible materials;
the wall of the rocket chamber generally forming a frustoconical portion surrounding a propellant exit configured to allow pressurized gas and combustion byproducts to exit to the nozzle.

18. The rocket motor of claim 17, further comprising:
two additional pressurized gas inlets configured to introduce gas into the chamber,
wherein the pressurized gas inlets are configured to introduce at least three propellant types into the chamber, the propellant types including: an inert gas and two volatile gasses when mixed in the chamber.

19. The rocket motor of claim 17, wherein the manifold comprises a plurality of interspersed openings configured to distribute the combustible materials within the chamber such that the combustible materials are substantially uniformly mixed, wherein the thermal mass comprises a plurality of openings configured to allow the combustible materials to pass through the thermal mass, thereby allowing heat conduction between the thermal mass and the combustible materials.

20. The rocket motor of claim 17, wherein the chamber comprises a combustion region in which the igniter is configured to ignite the combustion in the combustible materials, the combustion region is located adjacent to the thermal mass such that the combustion of the combustible materials provides heat to the thermal mass, thereby providing the thermal mass with additional energy for conductive heating.

21. The rocket motor of claim 17, wherein the first window is further configured to focus solar energy onto the thermal mass upstream of a combustion region within the chamber.

22. The rocket motor of claim 17, wherein the thermal mass comprises aggregate material sintered or confined together to create thermal contact and permitting fluid flow through open passages therein, the thermal mass configured for greater transparency to the solar energy in an upper layer and greater absorbance of the solar energy in a lower layer.

23. The rocket motor of claim 17, wherein the chamber comprises a plurality of zones of energy which increase as a distance between the zones and the nozzle decreases.

24. The rocket motor of claim 17, wherein the second window is arranged between the first window and the thermal mass and forms a plenum between the first window and the second window, the second window having a plurality of openings therein, the rocket motor further comprising:
a second inlet configured to introduce a second gas into the plenum, the second gas being cleaner than the gas introduced via the pressurized gas inlet; and
a pump configured to use solar energy to pump the gas into and through the pressurized gas inlet into the chamber,
wherein the openings in the second window are configured to allow the second gas to displace less clean material from within a predetermined distance of the second window, thereby deterring material build-up.

25. The rocket propulsion system of claim 1, wherein the rocket chamber comprises:
a pressurized rocket body, the plurality of transparent windows configured to admit the solar energy beam into the pressurized rocket body, the solar absorber material configured to: establish a thermal profile to heat the pressurized propulsive gases such that the heat of the pressurized propulsive gases increases as they pass through the solar absorber material; and
a combustion chamber configured to: receive the pressurized propulsive gases, and expel the pressurized propulsive gases through the rocket nozzle to produce rocket thrust.

26. The rocket propulsion system of claim 25, further comprising:

at least one injector configured to separately inject a gaseous combustible rocket fuel and a gaseous oxidizer into the combustion chamber; and an igniter configured to ignite the gaseous combustible rocket fuel and the gaseous oxidizer within the combustion chamber to produce pressurized combustion gases, wherein the combustion chamber is further configured to expel the pressurized combustion gases through the rocket nozzle to produce rocket thrust, wherein the at least one injector is further configured to inject the propellant simultaneous with the gaseous combustible rocket fuel and the gaseous oxidizer, and wherein the solar absorber comprises a plurality of beads.

27. The rocket propulsion system of claim 26 wherein the beads are arranged in layers to establish the thermal profile, with beads having similar absorption properties grouped at successive levels within the solar absorber.

28. The rocket propulsion system of claim 26 wherein the beads are made from refractory materials in a plurality of shapes, sizes, colors, and/or optical transparencies, and the beads are configured to establish the thermal profile by allowing solar energy to penetrate through at least some surface portions of the solar absorber, reducing heat of the surface portions, and be absorbed by deeper portions thereof, increasing heat of the deeper portions.

29. The rocket propulsion system of claim 26 wherein a number and type of the beads are chosen and assembled into a volume designed to absorb substantially a total input energy of the solar energy beam commensurate with a rocket of a predetermined power level.

30. The rocket propulsion system of claim 26 where a portion of the beads are formed from and/or coated with a catalytic material to promote a controlled exothermic dissociation of a monopropellant propulsion gas into one or more lower atomic weight gases.

31. The system of claim 1 wherein the solid materials of the plurality of transparent windows have an index of refraction that affects an amount of focusing of the solar energy beam.

* * * * *